(12) United States Patent
Maamari et al.

(10) Patent No.: US 12,542,746 B2
(45) Date of Patent: Feb. 3, 2026

(54) ENHANCED PROTOCOL DATA UNIT DISCARD PROCEDURES FOR MULTI-MODAL TRAFFIC

(71) Applicant: QUALCOMM Incorporated, San Diego, CA (US)

(72) Inventors: Diana Maamari, San Diego, CA (US); Linhai He, San Diego, CA (US); Mickael Mondet, Louannec (FR); Huilin Xu, Temecula, CA (US); Hyun Yong Lee, San Diego, CA (US)

(*) Notice: Subject to any disclaimer, the term of this patent is extended or adjusted under 35 U.S.C. 154(b) by 27 days.

(21) Appl. No.: 18/438,064

(22) Filed: Feb. 9, 2024

(65) Prior Publication Data

US 2025/0260651 A1    Aug. 14, 2025

(51) Int. Cl.
| | |
|---|---|
| H04L 47/32 | (2022.01) |
| H04W 28/06 | (2009.01) |
| H04W 36/00 | (2009.01) |
| H04W 36/22 | (2009.01) |
| H04W 80/08 | (2009.01) |

(52) U.S. Cl.
CPC ............. *H04L 47/32* (2013.01); *H04W 28/06* (2013.01); *H04W 80/08* (2013.01)

(58) Field of Classification Search
CPC ........ H04L 47/32; H04L 47/34; H04W 28/06; H04W 80/08; H04W 36/00; H04W 36/22; H04W 26/06

USPC .......................................................... 709/224
See application file for complete search history.

(56) References Cited

U.S. PATENT DOCUMENTS

| | | | | |
|---|---|---|---|---|
| 2002/0039350 | A1* | 4/2002 | Wang | H04L 49/90 370/230.1 |
| 2005/0141427 | A1* | 6/2005 | Bartky | H04L 47/31 370/428 |
| 2024/0259869 | A1* | 8/2024 | Ji | H04W 28/0289 |
| 2024/0314084 | A1* | 9/2024 | Esswie | H04L 47/28 |
| 2024/0314632 | A1* | 9/2024 | Esswie | H04L 1/1642 |

\* cited by examiner

*Primary Examiner* — Jude Jean Gilles

(57) ABSTRACT

Methods, systems, and devices for wireless communications are described. A user equipment (UE) may communicate multi-modal traffic with a network entity over multiple traffic flows. For example, the UE may communicate a first PDU set via a first traffic flow associated with a first discard timer, and a second PDU set via a second traffic flow associated with a second discard timer. The first PDU set may be associated with the second PDU set in accordance with the multi-modal traffic configuration. In some examples, the UE may discard both the first PDU set and the second PDU set upon expiration of the first discard timer. In some other examples, the UE may determine a value for a second timer based on a synchronization threshold duration and an overhead duration and may discard the second PDU set upon expiration of the second timer.

15 Claims, 13 Drawing Sheets

ENHANCED PROTOCOL DATA UNIT DISCARD PROCEDURES FOR MULTI-MODAL TRAFFIC

FIELD OF TECHNOLOGY

The following relates to wireless communications, including enhanced protocol data unit discard procedures for multi-modal traffic.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support enhanced protocol data unit discard procedures for multi-modal traffic. For example, the described techniques provide for a user equipment (UE) configured to communicate multi-modal traffic with a network entity over multiple traffic flows. For example, the UE may communicate a first PDU set via a first traffic flow associated with a first discard timer, and a second PDU set via a second traffic flow associated with a second discard timer. The first PDU set may be associated with the second PDU set in accordance with the multi-modal traffic configuration. In some examples, the UE may discard both the first PDU set and the second PDU set upon expiration of the first discard timer, even if the second discard timer has not yet expired. In some other examples, the UE may discard the first PDU set upon expiration of the first timer and the second PDU set upon expiration of a second timer. The UE may determine a value for the second timer based on a synchronization threshold duration and an overhead duration and may discard the second PDU set upon expiration of the second timer.

A method for wireless communications by a first wireless device is described. The method may include receiving a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow and discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

A first wireless device for wireless communications is described. The first wireless device may include one or more memories storing processor executable code, and one or more processors coupled with the one or more memories. The one or more processors may individually or collectively be operable to execute the code to cause the first wireless device to receive a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow and discard a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

Another first wireless device for wireless communications is described. The first wireless device may include means for receiving a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow and means for discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

A non-transitory computer-readable medium storing code for wireless communications is described. The code may include instructions executable by one or more processors to receive a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow and discard a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

Some examples of the method, first wireless devices, and non-transitory computer-readable medium described herein may further include operations, features, means, or instructions for receiving control information indicating to discard the first PDU or the first PDU set based on expiration of the second discard timer for the second PDU or the second PDU set from the second traffic flow.

In some examples of the method, first wireless devices, and non-transitory computer-readable medium described herein, the control message or a second control message includes the control information.

In some examples of the method, first wireless devices, and non-transitory computer-readable medium described herein, the first PDU or the first PDU set may be discarded after the synchronization time duration threshold may have elapsed after expiration of the second discard timer.

Some examples of the method, first wireless devices, and non-transitory computer-readable medium described herein may further include operations, features, means, or instructions for transmitting a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

Some examples of the method, first wireless devices, and non-transitory computer-readable medium described herein may further include operations, features, means, or instructions for transmitting a third PDU or a third PDU set of the first traffic flow after expiration of the first discard timer and prior to a duration of time elapsing corresponding to the synchronization time duration threshold and an overhead time duration, the duration of time beginning upon communication of a fourth PDU or a fourth PDU set of the second traffic flow associated with the third PDU or the third PDU set.

Some examples of the method, first wireless devices, and non-transitory computer-readable medium described herein may further include operations, features, means, or instructions for receiving an indication to discard a third PDU or a third PDU set of the first traffic flow based on one of expiration of the second discard timer or expiration of the first discard timer and discarding the third PDU or the third PDU set in accordance with the indication.

In some examples of the method, first wireless devices, and non-transitory computer-readable medium described herein, the first PDU or the first PDU set may be associated with an identifier that may be shared with the second PDU or the second PDU set.

In some examples of the method, first wireless devices, and non-transitory computer-readable medium described herein, the identifier indicates an association between the first traffic flow and the second traffic flow and the first PDU or the first PDU set may be discarded based on the expiration of the second discard timer and the identifier.

In some examples of the method, first wireless devices, and non-transitory computer-readable medium described herein, the first wireless device may be a user equipment (UE) or a network entity.

A method for wireless communications by a second wireless device is described. The method may include outputting a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow, monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur, and suspending the monitoring for the first PDU or the first PDU set from the first traffic flow based on expiration of the second discard timer for the second PDU or the second PDU set from the second traffic flow.

A second wireless device for wireless communications is described. The second wireless device may include one or more memories storing processor executable code, and one or more processors coupled with the one or more memories. The one or more processors may individually or collectively be operable to execute the code to cause the second wireless device to output a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow, monitor for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur, and suspend the monitoring for the first PDU or the first PDU set from the first traffic flow based on expiration of the second discard timer for the second PDU or the second PDU set from the second traffic flow.

Another second wireless device for wireless communications is described. The second wireless device may include means for outputting a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow, means for monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur, and means for suspending the monitoring for the first PDU or the first PDU set from the first traffic flow based on expiration of the second discard timer for the second PDU or the second PDU set from the second traffic flow.

A non-transitory computer-readable medium storing code for wireless communications is described. The code may include instructions executable by one or more processors to output a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow, monitor for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur, and suspend the monitoring for the first PDU or the first PDU set from the first traffic flow based on expiration of the second discard timer for the second PDU or the second PDU set from the second traffic flow.

Some examples of the method, second wireless devices, and non-transitory computer-readable medium described herein may further include operations, features, means, or instructions for outputting control information to a first wireless device indicating to discard a first PDU or a first PDU set based on expiration of the second discard timer for the second PDU or the second PDU set from the second traffic flow.

In some examples of the method, second wireless devices, and non-transitory computer-readable medium described herein, the control message or a second control message includes the control information.

Some examples of the method, second wireless devices, and non-transitory computer-readable medium described herein may further include operations, features, means, or instructions for monitoring for a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

Some examples of the method, second wireless devices, and non-transitory computer-readable medium described herein may further include operations, features, means, or instructions for monitoring for a third PDU or a third PDU set of the first traffic flow after expiration of the first discard timer and prior to a duration of time elapsing corresponding to the synchronization time duration threshold and an overhead duration, the duration of time beginning upon communication of a fourth PDU or a fourth PDU set of the second traffic flow associated with the third PDU or the third PDU set.

Some examples of the method, second wireless devices, and non-transitory computer-readable medium described herein may further include operations, features, means, or instructions for monitoring for a third PDU or a third PDU set from the first traffic flow and a fourth PDU or a fourth PDU set from the second traffic flow in accordance with the configuration.

Some examples of the method, second wireless devices, and non-transitory computer-readable medium described herein may further include operations, features, means, or instructions for outputting an indication for a first wireless device to discard a third PDU or a third PDU set of the first traffic flow based on one of expiration of the second discard timer or expiration of the first discard timer.

In some examples of the method, second wireless devices, and non-transitory computer-readable medium described herein, the first PDU or the first PDU set may be associated with an identifier that may be shared with the second PDU or the second PDU set.

In some examples of the method, second wireless devices, and non-transitory computer-readable medium described herein, the identifier indicates an association between the first traffic flow and the second traffic flow.

In some examples of the method, second wireless devices, and non-transitory computer-readable medium described herein, the second wireless device may be a UE or a network entity.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver(s), adders/summers, etc.). It is intended that innovations described herein may be practiced in a wide variety of devices, chip-level components, systems, distributed arrangements, end-user devices, etc. of varying sizes, shapes, and constitution.

DETAILED DESCRIPTION

In some wireless communications systems, a user equipment (UE) may communicate information with a network entity via multiple data streams (e.g., multi-modal traffic). For example, the UE may communicate first data (e.g., audio traffic) with the network entity via a first traffic flow and second data (e.g., video traffic, tactile traffic, etc.) with the network entity via a second traffic flow. The UE may communicate data associated with multi-modal traffic (e.g., low-latency traffic, extended reality (XR) traffic) according to a synchronization threshold, where a first traffic flow may be communicated within a threshold duration from a second traffic flow. In some examples, the first data (e.g., a protocol data unit (PDU), a PDU set) may be associated with a first timer and the second data may be associated with a second timer that is different from the first timer. In some cases, the UE may discard the first data upon expiration of the first timer. In such cases, data associated with the discarded first data (e.g., the second data) may not be used by the UE or the network entity for communications. However, the UE may not discard associated data (e.g., the second data) until expiration of the second timer.

Various aspects of the present disclosure are related to enhanced protocol data unit (PDU) discard procedures for multi-modal traffic. A UE may receive first data (e.g., a first PDU, a first PDU set) associated with a first timer and second data (e.g., a second PDU, a second PDU set) associated with a second timer. In some examples, the UE may discard both the first data and the second data upon expiration of the first timer. In some other examples, the UE may determine whether to discard the second data according to the first timer or the second timer based on a configuration (e.g., from a network entity). Additionally, or alternatively, the UE may be configured to determine a value for the second timer based on a synchronization threshold duration and an overhead duration and may discard the second data upon expiration of the second timer. In some implementations, a portion of the first data (e.g., one or more PDUs, one or more PDU sets) and a portion of the second data may be associated with a common parameter (e.g., identifier). In such cases, the UE may determine to discard the portion of the first data associated with the common identifier upon expiration of the second timer.

Aspects of the disclosure are initially described in the context of wireless communications systems. Aspects of the disclosure are additionally illustrated by communications timelines and process flows. Aspects of the disclosure are further illustrated by and described with reference to apparatus diagrams, system diagrams, and flowcharts that relate to enhanced protocol data unit discard procedures for multi-modal traffic.

Figure 1:
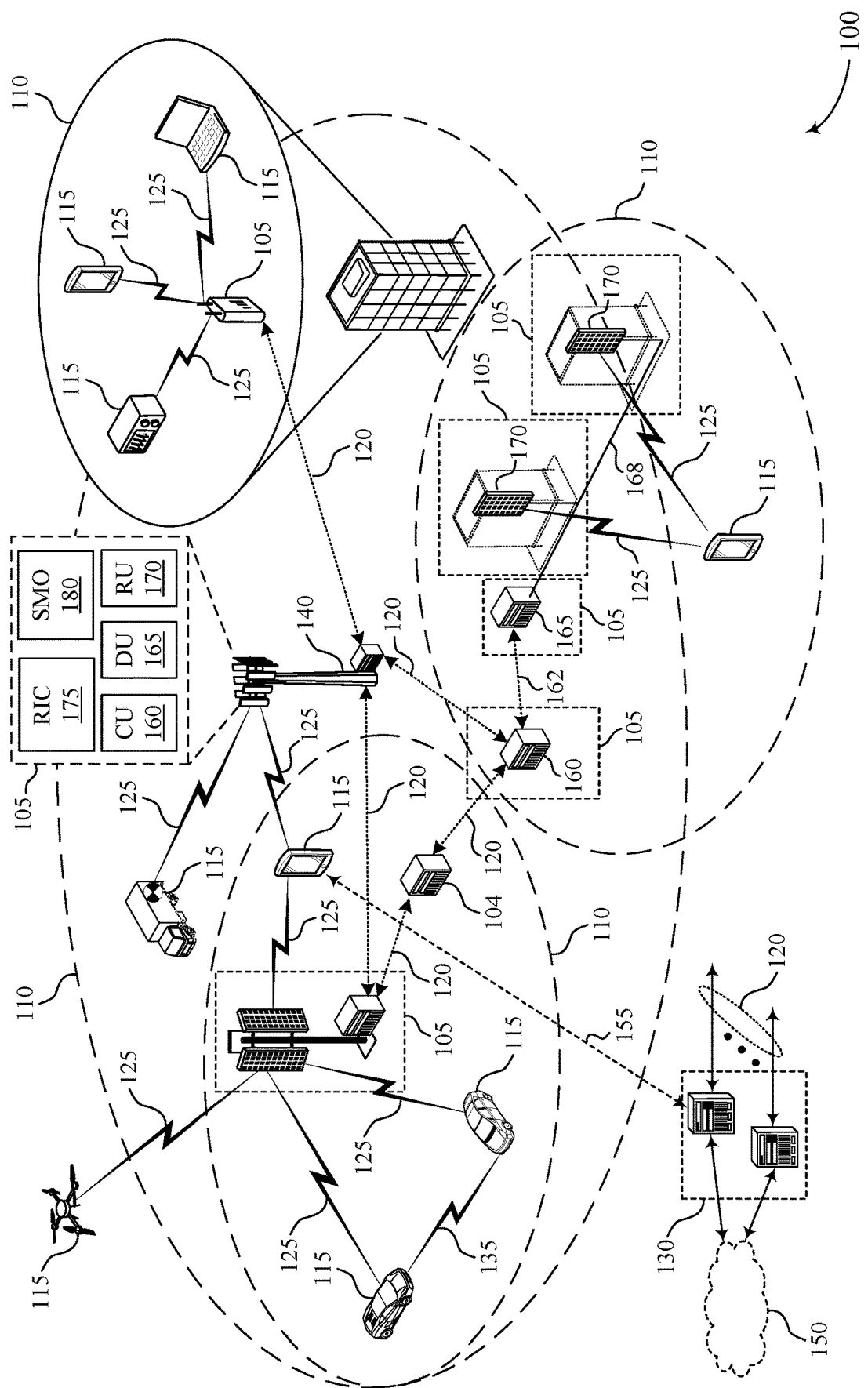
FIG. 1 shows an example of a wireless communications system that supports enhanced protocol data unit discard procedures for multi-modal traffic in accordance with one or more aspects of the present disclosure.

FIG. 1 shows an example of a wireless communications system 100 that supports enhanced protocol data unit discard procedures for multi-modal traffic in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both.

For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support enhanced protocol data unit discard procedures for multi-modal traffic as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations, a UE 115 (e.g., an extended reality (XR) device) may be configured to communicate multi-modal traffic with a network entity 105 over multiple traffic flows. For example, the UE 115 may communicate a first PDU set via a first traffic flow associated with a first discard timer, and a second PDU set via a second traffic flow associated with a second discard timer. The first PDU set may be associated with the second PDU set in accordance with the multi-modal traffic configuration. For example, the first PDU set and the second PDU set may be associated with a common parameter (e.g., an identifier). The UE 115 may discard the first PDU set upon expiration of the first discard timer. Similarly, based on the common parameter and the configuration, the UE 115 may discard the second PDU set upon expiration of the first discard timer, even if the second discard timer has not yet expired. In some other examples, the UE 115 may discard the second PDU set upon expiration of the second discard timer. In such examples, the UE 115 may determine a value for the second timer based on a synchronization threshold duration and an overhead duration and may discard the second PDU set upon expiration of the second timer.

Figure 2:
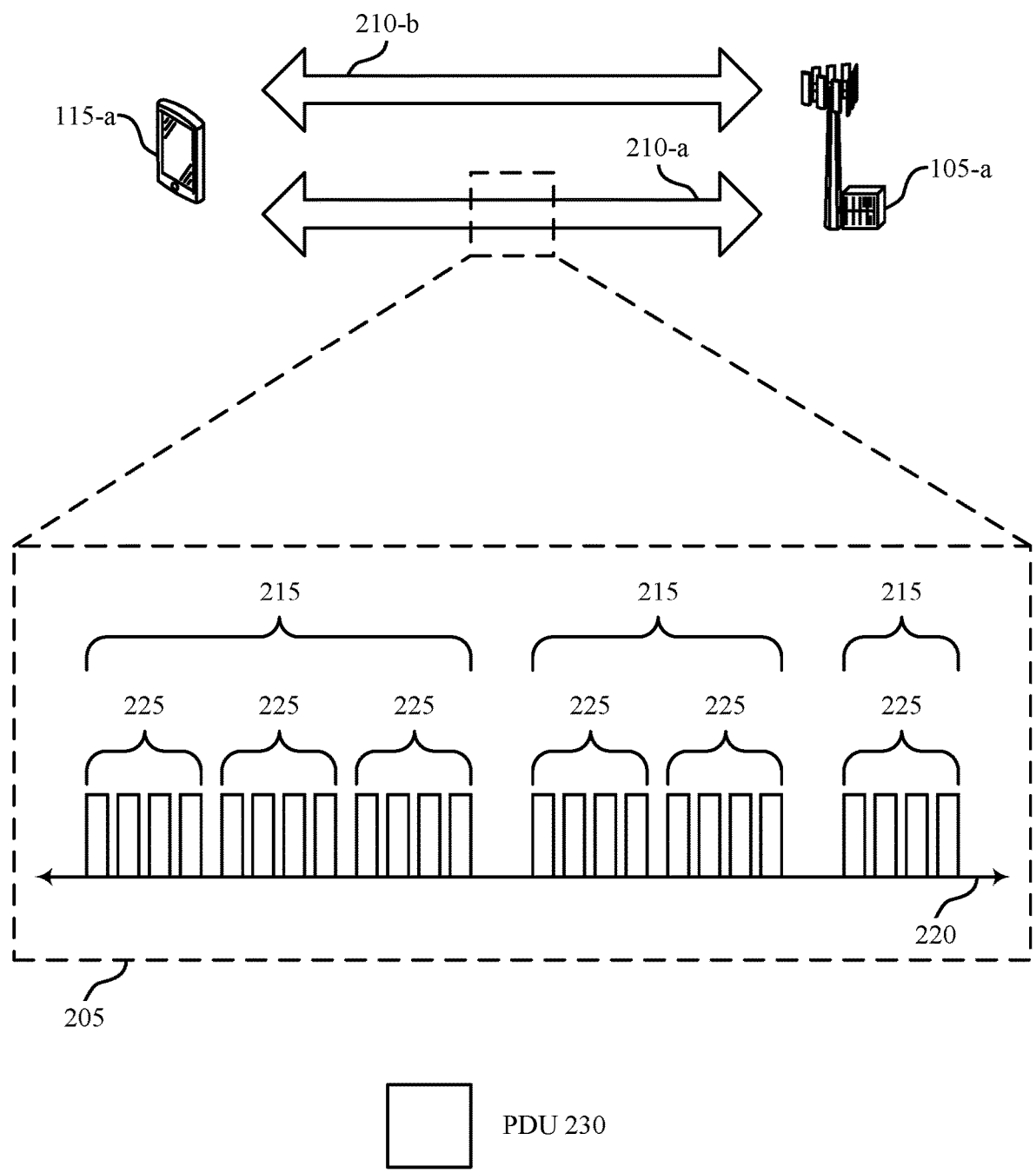
FIG. 2 shows an example of a wireless communications system that supports enhanced protocol data unit discard procedures for multi-modal traffic in accordance with one or more aspects of the present disclosure.

FIG. 2 shows an example of a wireless communications system 200 that supports enhanced protocol data unit discard procedures for multi-modal traffic in accordance with one or more aspects of the present disclosure. The wireless communications system 200 may include a UE 115-a in communication with a network entity 105-a, which may be examples of corresponding devices as described herein, including with reference to FIG. 1. In some examples, the UE 115-a may be an example of an extended reality (XR) device (e.g., a head-mounted-display (HMD), a controller, a positional tracker, a haptic device). The UE 115-a may communicate with the network entity 105-a via a cellular (e.g., fifth generation (5G)) communications interface (e.g., a Uu link).

In some examples, the UE 115-a and the network entity 105-a may communicate network traffic 205 via multiple traffic flows 210 (e.g., Quality of Service (QoS) flows), including first traffic flow 210-*a* and second traffic flow 210-*b*. Each traffic flow 210 may comprise uplink and downlink communications between the UE 115-*a* and the network entity 105-*a*. Network traffic 205 may be comprised of one or more data bursts 215 communicated over a duration represented by the horizontal axis 220. Each data burst 215 may be comprised of one or more packet data unit (PDU) sets 225. The UE 115-*a* and the network entity 105-*a* may communicate data via the PDU sets 225. A PDU set 225 may refer to two or more PDUs 230 which are to be delivered to a radio access network (RAN) as an integrated unit to an application. For example, a PDU set 225 may be associated with a video frame, a slice within a video frame, or the like. In some examples, each PDU set 225 may include one or more PDUs 230 carrying a payload of a unit of information generated at the application level (e.g., video frames, video slices, audio, haptic or tactile data).

The PDUs 230 comprising each PDU set 225 may be communicated as an integrated unit within the same traffic flow 210 and may share the same QoS attributes (e.g., a PDU set error rate (PSER), a PDU set delay budget (PSDB), a PDU set integrated handling indication (PSIHI)). Each PDU 230 may be marked with PDU set information, and a scheduler (e.g., the network entity 105-*a*) may handle coordinating PDUs 230 and PDU sets 225. A traffic flow 210 may transfer PDUs 230 that are marked with PDU set information or may transfer unmarked PDUs 230.

PDU set information may include static PDU set information and dynamic PDU set information. Static PDU set information may include information for PDU set QoS flow establishment, including a PSER (e.g., a maximum rate for non-congestion related packet losses), a PSDB (e.g., a maximum time between the reception of a first PDU 230 and the successful deliver of a last arrived PDU 230 of a PDU set 225), a PSIHI (e.g., indication of whether all PDUs 230 are to be used for a PDU set 225 by the application layer), or any combination thereof. Dynamic PDU set information may include a PDU set sequence number, an indication of an end PDU 230 of a PDU set 225, a PDU sequence number within a PDU set 225, a PDU set size in bytes, an indication of PDU set importance, or any combination thereof. The dynamic PDU set information may be provided to the RAN by a communication function (e.g., a user plane function (UPF)) via a header of a general packet radio service (GPRS) tunneling protocol in user plane (GTP-U) message. In some examples, the UPF may identify the PDU set information by detecting PDU sets 225 based on one or more traffic characteristics (e.g., QoS attributes) associated with the PDU sets 225. In some other examples, the UPF may identify the PDU set information based on one or more real time transport protocol (RTP) headers.

Each traffic flow 210 may be associated with a type of data. For example, in some cases, the first traffic flow 210-*a* may be associated with audio data, and the second traffic flow 210-*b* may be associated with video data. In some other cases, the first traffic flow 210-*a* may be associated with video data and the second traffic flow 210-*b* may be associated with tactile data. Each traffic flow 210 may also be associated with one or more QoS attributes (e.g., a PDU set error rate (PSER), a PDU set delay budget (PSDB), a PDU set integrated handling indication (PSIHI)) based on the type of data associated with the traffic flow 210. For example, a packet data convergence protocol (PDCP) discard timer may be configured for each traffic flow 210 based on the QoS attributes associated with each traffic flow 210. Each traffic flow 210 may have a different PDCP timer based on the respective QoS requirements for the data type associated with each traffic flow 210. In an example, the first traffic flow 210-*a* may be configured with a first PDCP discard timer associated with audio data, and the second traffic flow 210-*b* may be configured with a second PDCP discard timer associated with video data. The UE 115-*a* and the network entity 105-*a* may communicate network traffic 205 in accordance with the QoS attributes for each traffic flow 210. Though FIG. 2 only depicts a first traffic flow 210-*a* and a second traffic flow 210-*b*, there may be additional traffic flows 210 between the UE 115-*a* and the network entity 105-*a*, each associated with a same type of data or a different type of data than the first traffic flow 210-*a* and the second traffic flow 210-*b*.

In some implementations (e.g., XR applications), the UE 115-*a* and the network entity 105-*a* may be configured to communicate multi-modal traffic. XR applications may include multiple separately-handled media components (e.g., a HMD, controllers, positional trackers, haptic devices) each associated with one or more type of data (e.g., modality). For example, a HMD-component may be associated with audio and video data, and a controller may be associated with tactile data. XR applications may include the simultaneous communication of application data from multiple media components associated with multiple respective traffic flows 210. For example, a HMD may communicate both audio and video data, and a controller may communicate tactile data. All application data associated with a UE 115-*a* may be communicated in one PDU session.

To facilitate smooth user-end experiences (e.g., viewer synchronization), the UE 115-*a* and the network entity 105-*a* may enforce (e.g., apply) one or more synchronization thresholds on the data types associated with multi-modal traffic. For example, the network entity 105-*a* may communicate audio data, video data, and tactile data to one or more UEs 115-*a* (e.g., a HMD, a controller) as part of an XR application. In some examples, the UE 115-*a* and the network entity 105-*a* may enforce a synchronization threshold (e.g., of at most 50 ms) between communicating tactile data and communicating corresponding audio data. Similarly, the UE 115-*a* and the network entity 105-*a* may enforce a synchronization threshold (e.g., of at most 15 ms) between communicating tactile data and communicating corresponding video data. Additionally, or alternatively, the UE 115-*a* and the network entity 105-*a* may enforce a synchronization threshold (e.g., of at most 25 ms) between communicating audio data and communicating corresponding tactile data, and a synchronization threshold (e.g., of at most 50 ms) between communicating audio data and communicating corresponding tactile data.

In an example, at least two traffic flows 210 (e.g., the first traffic flow 210-*a* and the second traffic flow 210-*b*) may be coordinated (e.g., scheduled) according to a maximum synchronization threshold to prevent asynchrony between data streams. For example, network traffic 205 (e.g., XR traffic) may include audio data and video data, and the UE 115-*a* and the network entity 105-*a* may communicate the audio data via the first traffic flow 210-*a* and the video data via the second traffic flow 210-*b*. The UE 115-*a* and the network entity 105-*a* may coordinate the traffic flows 210 such that the audio data is communicated within a synchronization threshold duration from the video data, or vice versa. The PDU sets 225 may be used for uplink or downlink communications. For example, the first traffic flow 210-*a* may represent uplink audio traffic between the UE 115-*a* and the network entity 105-*a*, and the second traffic flow 210-*b* may represent downlink video traffic between the UE 115-*a* and the network entity 105-*a*.

In some examples, PDU sets 225 associated with multi-modal traffic may be configured with a common identifier. The UE 115-*a* may determine an association between two or more PDU sets 225 of different traffic flows 210 based on the common identifier shared between the two or more PDU sets 225. For example, PDU sets 225 associated with the first traffic flow 210-*a* may share a common identifier with PDU sets 225 associated with the second traffic flow 210-*b*. In some cases, the UE 115-*a* may determine to discard the PDU sets 225 associated with the first traffic flow 210-*a* (e.g., based on the expiration of a timer). In such cases, the UE 115-*a* may also determine to discard the PDU sets 225 associated with the second traffic flow 210-*b* based on the common identifier. The common identifier may be applicable to PDU sets 225 communicated over uplink, downlink, or both. Additional details are discussed herein with respect to FIGS. 3A and 3B.

In some examples, the UE 115-*a* and the network entity 105-*a* may discard one or more PDUs 230 from a traffic flow 210. For example, the UE 115-*a* and the network entity 105-*a* may discard a PDU 230 from the first traffic flow 210-*a*. In some cases, the UE 115-*a* and the network entity 105-*a* may discard the PDU 230 if the PDU 230 has no remaining delay budget left (e.g., upon expiration of an associated PDCP discard timer). The remaining time $T_{remaining}$ of a PDU 230 may be represented by Equation 1.

$$T_{remaining} = PDCP_B - X \qquad (1)$$

$PDCP_B$ may represent the PDCP discard timer, and X may represent a time spent in a buffer by the PDU 230 in ms (e.g., the slot in which the PDU 230 is communicated). If the PDU 230 is communicated over downlink, the UE 115-*a* may also discard other packets associated with the expired PDU 230. In some other cases, the UE 115-*a* and the network entity 105-*a* may discard the PDU 230 if the content criteria of the PDU set 225 comprised of the PDU 230 is not met (data loss for "all or nothing" content criteria) or met (e.g., enough PDUs 230 of the PDU set 225 have been successfully communicated). The UE 115-*a* or the network entity 105-*a* may also discard PDU sets 225 and data bursts 215 in addition to PDUs 230. For example, the network entity may determine to discard a PDU set based on an indication of PDU set importance included in the dynamic PDU set information.

In some examples, the UE 115-*a* may be configured (e.g., via radio resource control (RRC) signaling) with an association (e.g., a multi-modal service identifier (ID)) indicating that a PDU set 225 from a traffic flow 210 (e.g., the first traffic flow 210-*a*) is associated with a PDU set 225 from another traffic flow 210 (e.g., the second traffic flow 210-*b*). In such examples, if the UE 115-*a* and the network entity 105-*a* discard one or more PDUs 230 from the first traffic flow 210-*a* (e.g., upon expiration of the first PDCP discard timer), the UE 115-*a* and the network entity 105-*a* may also discard one or more corresponding PDUs 230 from the second traffic flow 210-*b*. For example, the UE 115-*a* may determine to discard one or more PDU sets 225 from the second traffic flow 210-*b* that are associated with the same multi-modal service identifier (ID) as the UE 115-*a* and one or more PDU set 225 from the first traffic flow 210-*a*. Additional details are discussed herein with respect to FIGS. 3A and 3B. In some other examples, the UE 115-*a* may not be configured with the association and may discard the one or more corresponding PDUs 230 from the second traffic flow 210-*b* upon expiration of the second PDCP discard timer in accordance with legacy discard procedures.

Figure 3A:
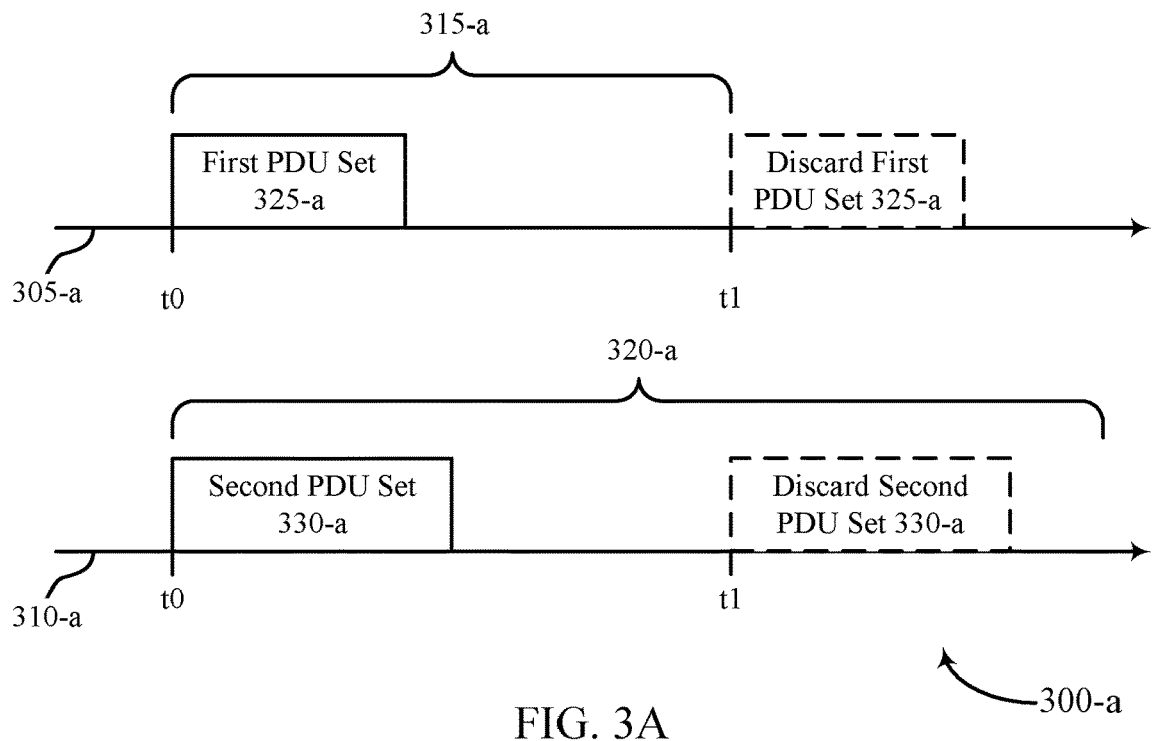
FIGS. 3A and 3B shows examples of communications timelines that supports enhanced protocol data unit discard procedures for multi-modal traffic in accordance with one or more aspects of the present disclosure.

FIG. 3A shows an example of a communications timeline 300-*a* that supports enhanced protocol data unit discard procedures for multi-modal traffic in accordance with one or more aspects of the present disclosure. In some examples, a UE may communicate with a network entity, which may be examples of corresponding devices as described herein, including with reference to FIGS. 1 and 2. The UE and the network entity may be configured to communicate multi-modal traffic, including first traffic flow 305-*a* and second traffic flow 310-*a*. For example, the UE may be configured with a parameter (e.g., a multi-modal service identifier) indicating an association between the first traffic flow 305-*a* and the second traffic flow 310-*a*. The first traffic flow 305-*a* may be associated with a first PDCP discard timer 315-*a*, and the second traffic flow 310-*a* may be associated with a second PDCP discard timer 320-*a*.

At time t0, the UE and the network entity may communicate a first PDU set 325-*a* via the first traffic flow 305-*a* and a second PDU set 330-*a* via the second traffic flow 310-*a*. Upon receiving the first PDU set 325-*a* and the second PDU set 330-*a*, the UE and the network entity may initialize the first PDCP discard timer 315-*a* and the second PDCP discard timer 320-*a*.

At time t1, the first PDCP discard timer 315-*a* may expire. Accordingly, the UE may discard the first PDU set 325-*a*. The UE may determine (e.g., based on the configured multi-modal service identifier) an association between the first PDU set 325-*a* and the second PDU set 330-*a*, and may also discard the second PDU set 330-*a*. The UE may discard the second PDU set 330-*a* prior to expiration of the second PDCP discard timer 320-*a* based on the association between the first PDU set 325-*a* and the second PDU set 330-*a*. In an example, for multi-modal XR traffic, the UE may discard one or more PDUs, one or more PDU sets (e.g., the first PDU set 325-*a*), or both, from the first traffic flow 305-*a* associated with one or more PDUs, one or more PDU sets (the second PDU set 330-*a*), or both, from the second traffic flow 310-*a* even if the second PDCP discard timer 320-*a* has not yet expired. Similarly, the network entity may stop monitoring for the first PDU set 325-*a* and the second PDU set 330-*a* upon expiration of the first PDCP discard timer 315-*a*.

Figure 3B:
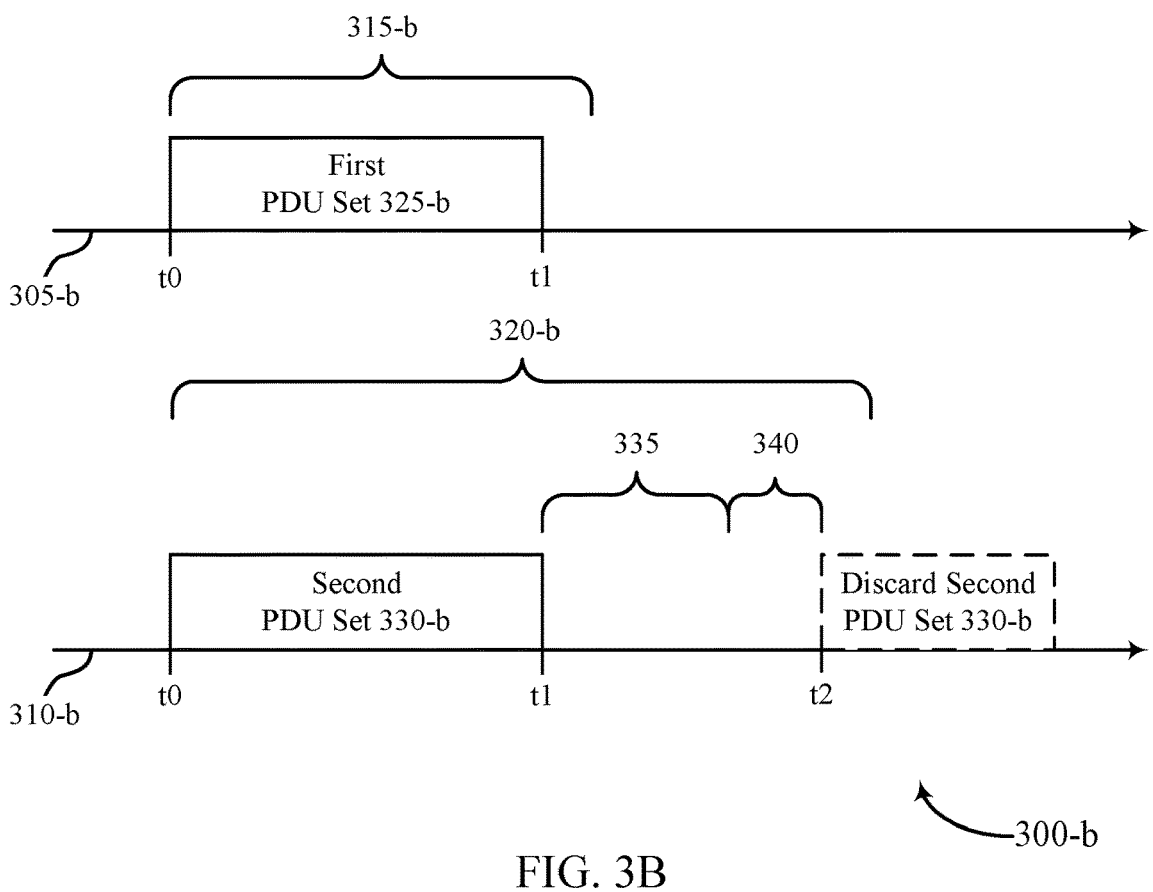

FIG. 3B shows an example of a communications timeline 300-*b* that supports enhanced protocol data unit discard procedures for multi-modal traffic in accordance with one or more aspects of the present disclosure. In some examples, a UE may communicate with a network entity, which may be examples of corresponding devices as described herein, including with reference to FIGS. 1 and 2. The UE and the network entity may be configured to communicate multi-modal traffic, including first traffic flow 305-*b* and second traffic flow 310-*b*. For example, the UE may be configured with a parameter (e.g., a multi-modal service identifier) indicating an association between the first traffic flow 305-*b* and the second traffic flow 310-*b*. The first traffic flow 305-*b* may be associated with a first PDCP discard timer 315-*b*, and the second traffic flow 310-*b* may be associated with a default second PDCP discard timer 320-*b* and an adaptive second PDCP discard timer. In some examples, the adaptive second PDCP discard timer may be a function of the first PDCP discard timer 315-*b*.

At time t0, the UE and the network entity may communicate a first PDU set 325-*b* via the first traffic flow 305-*b* and a second PDU set 330-*b* via the second traffic flow 310-*b*. Upon receiving the first PDU set 325-*b* and the second PDU set 330-*b*, the UE and the network entity may initialize the first PDCP discard timer 315-*b* and the adaptive second PDCP discard timer.

At time t1, the UE and the network entity may communicate a packet from the first PDU set 325-*b* before the expiration of the first PDCP discard timer 315-*b*. Because the packet was communicated right at the end of the first PDCP discard timer 315-*b* at time t1, a corresponding packet from the second PDU set 330-*b* should have up to a synchronization threshold value 335 (e.g., 15 ms, 25 ms, 50 ms, etc.) before being discarded (e.g., before the packet becomes useless). In an example, the UE may be configured with an adaptive second PDCP timer as a function of the first PDCP discard timer 315-*b* for the first traffic flow 305-*b*. The UE may determine the value of the adaptive second PDCP discard timer according to the minimum of: the default second PDCP discard timer 320-*b*, and the sum of time t1 and a synchronization threshold value 335, where t1 is the time of communication of the packet from the first PDU set 325-*b* from the first traffic flow 305-*b*. In some cases, the UE may determine the default second PDCP discard timer 320-*b* based on the PSDB of the second traffic flow 310-*b*. The UE may determine the value of the adaptive second PDCP discard timer $PDCP_B$ according to Equation 2.

$$PDCP_B = \min(T1 + ST, PDCP_{B,default}) \quad (2)$$

T1 may represent the time t1 at which the UE and the network entity communicate the packet from the first PDU set 325-*b* and ST may represent the synchronization threshold value 335. $PDCP\,Timer_{B,default}$ may represent the default second PDCP discard timer 320-*b*. In such examples, the UE may add ST to T1 and compare the result to the default second PDCP discard timer 320-*b* to determine the value of the adaptive second PDCP discard timer. Additionally, in some examples, the UE may be configured with additional overhead and may consider the overhead when determining the value of the adaptive second PDCP discard timer $PDCP_B$ according to Equation 3.

$$PDCP_B = \min(T1 + ST + OH, PDCP_{B,default}) \quad (3)$$

OH may represent an overhead duration 340. In such examples, the UE may add ST and OH to T1 and compare the result to the default second PDCP discard timer 320-*b* to determine the value of the adaptive second PDCP discard timer. In some cases, the UE may determine the value of the adaptive second PDCP discard timer because the network entity may not know the value of t1.

At time t2, the UE may discard the second PDU set 330-*b* upon expiration of the adaptive second PDCP discard timer. Similarly, the network entity may stop monitoring for the second PDU set 330-*a* upon expiration of the adaptive second PDCP discard timer.

Figure 4:
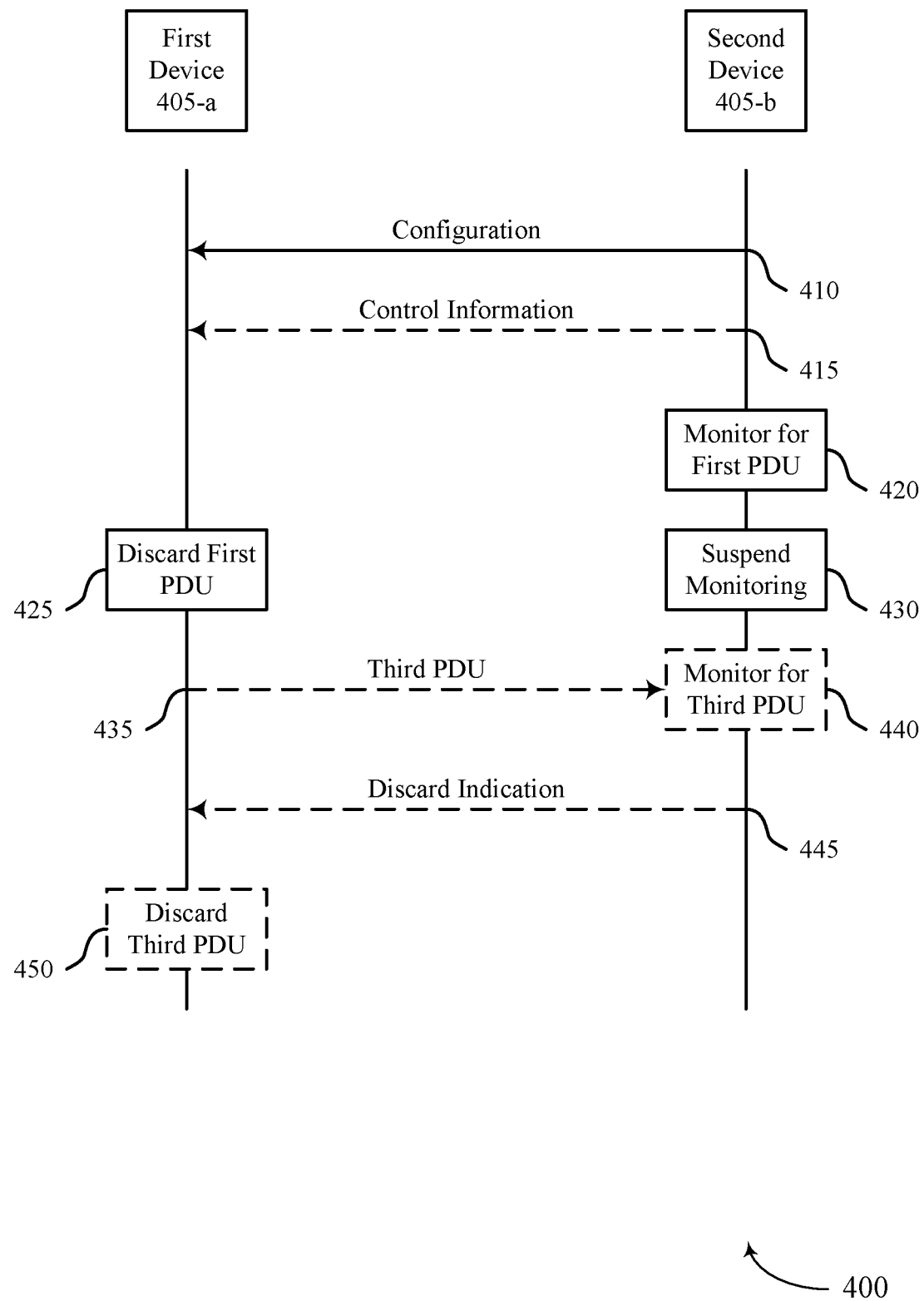
FIG. 4 shows an example of a process flow that supports enhanced protocol data unit discard procedures for multi-modal traffic in accordance with one or more aspects of the present disclosure.

FIG. 4 shows an example of a process flow 400 that supports enhanced protocol data unit discard procedures for multi-modal traffic in accordance with one or more aspects of the present disclosure. The process flow 400 may implement or be implemented by aspects of the wireless communications system 100 and the wireless communications system 200, as described with reference to FIGS. 1 and 2. For instance, in the example of FIG. 4, a first device 405-*a* may be in communication with a second device 405-*b*, which may be examples of devices described herein with reference to FIG. 1 or FIG. 2. For example, the first device 405-*a* may be a UE, and the second device 405-*b* may be a network entity. Alternatively, the first device 405-*a* may be a network entity, and the second device 405-*b* may be a UE. In the following description of the process flow 400, the operations between the first device 405-*a* and the second device 405-*b* may be performed in a different order than the example shown, or the operations between the first device 405-*a* and the second device 405-*b* may be performed in different orders at different times. Some operations may also be omitted from the process flow 400, and other operations may be added to the process flow 400.

At 410, the first device 405-*a* may receive a control message indicating a configuration that identifies a first traffic flow and a second traffic flow for communicating PDUs or PDU sets of a multi-modal communication service. In some examples, the configuration may indicate a first discard timer associated with the first traffic flow and a second discard timer associated with the second traffic flow.

At 415, the first device 405-*a* may receive control information indicating to discard a first PDU or a first PDU set based on expiration of the second discard timer for a second PDU or a second PDU set from the second traffic flow. The first PDU or the first PDU set may be associated with an identifier that is shared with the second PDU or the second PDU set and that indicates an association between the first traffic flow and the second traffic flow. In some examples, the control information is included in the control message or a second control message.

At 420, the second device 405-*b* may monitor for the first PDU or the first PDU set from the first traffic flow and for the second PDU or the second PDU set from the second traffic flow. In some examples, communication of the first PDU or the first PDU set is scheduled to occur within a synchronization time duration threshold relative to when communication of the second PDU or the second PDU set is scheduled to occur.

At 425, the first device 405-*a* may discard the first PDU or the first PDU set from the first traffic flow prior to expiration of the first discard timer for the first PDU or the first PDU set based on the expiration of the second discard timer for a second PDU or a second PDU set from the second traffic flow and the identifier. For example, the first device 405-*a* may discard the first PDU or the first PDU after the synchronization time duration threshold has elapsed after expiration of the second discard timer.

At 430, the second device 405-*b* may suspend the monitoring for the first PDU or the first PDU set from the first traffic flow based on the expiration of the second discard timer for the second PDU or the second PDU set from the second traffic flow.

At 435, in some examples, the first device 405-*a* may transmit a third PDU or a third PDU set of the first traffic flow after the expiration of the second discard timer and prior to a duration of time elapsing corresponding to the synchronization time duration threshold. In such examples, the duration of time may begin upon communication of a fourth PDU or a fourth PDU set of the second traffic flow associated with the third PDU or the third PDU set.

In some other examples, the first device 405-*a* may transmit the third PDU or the third PDU set of the first traffic flow after the expiration of the first discard timer and prior to the duration of time elapsing corresponding to the synchronization time duration threshold and an overhead time duration. In such other examples, the duration of time may begin upon communication of the fourth PDU or the fourth PDU set of the second traffic flow associated with the third PDU or the third PDU set.

At 440, in some examples, the second device 405-b may monitor for the third PDU or the third PDU set of the first traffic flow after the expiration of the second discard timer and prior to the duration of time elapsing corresponding to the synchronization time duration threshold. In some examples, the duration of time may begin upon communication of the fourth PDU or the fourth PDU set of the second traffic flow associated with the third PDU or the third PDU set.

In some other examples, the second device 405-b may monitor for the third PDU or the third PDU set of the first traffic flow after the expiration of the first discard timer and prior to the duration of time elapsing corresponding to the synchronization time duration threshold and an overhead duration. In such other examples, the duration of time may begin upon communication of the fourth PDU or the fourth PDU set of the second traffic flow associated with the third PDU or the third PDU set. Alternatively, the second device 405-b may monitor for the third PDU or the third PDU set from the first traffic flow and the fourth PDU or the fourth PDU set from the second traffic flow in accordance with the configuration.

At 445, the first device 405-a may receive an indication to discard the third PDU or the third PDU set of the first traffic flow based on one of the expiration of the second discard timer or the expiration of the first discard timer. Accordingly, at 450, the first device 405-a may discard the third PDU or the third PDU set in accordance with the indication.

Figure 5:
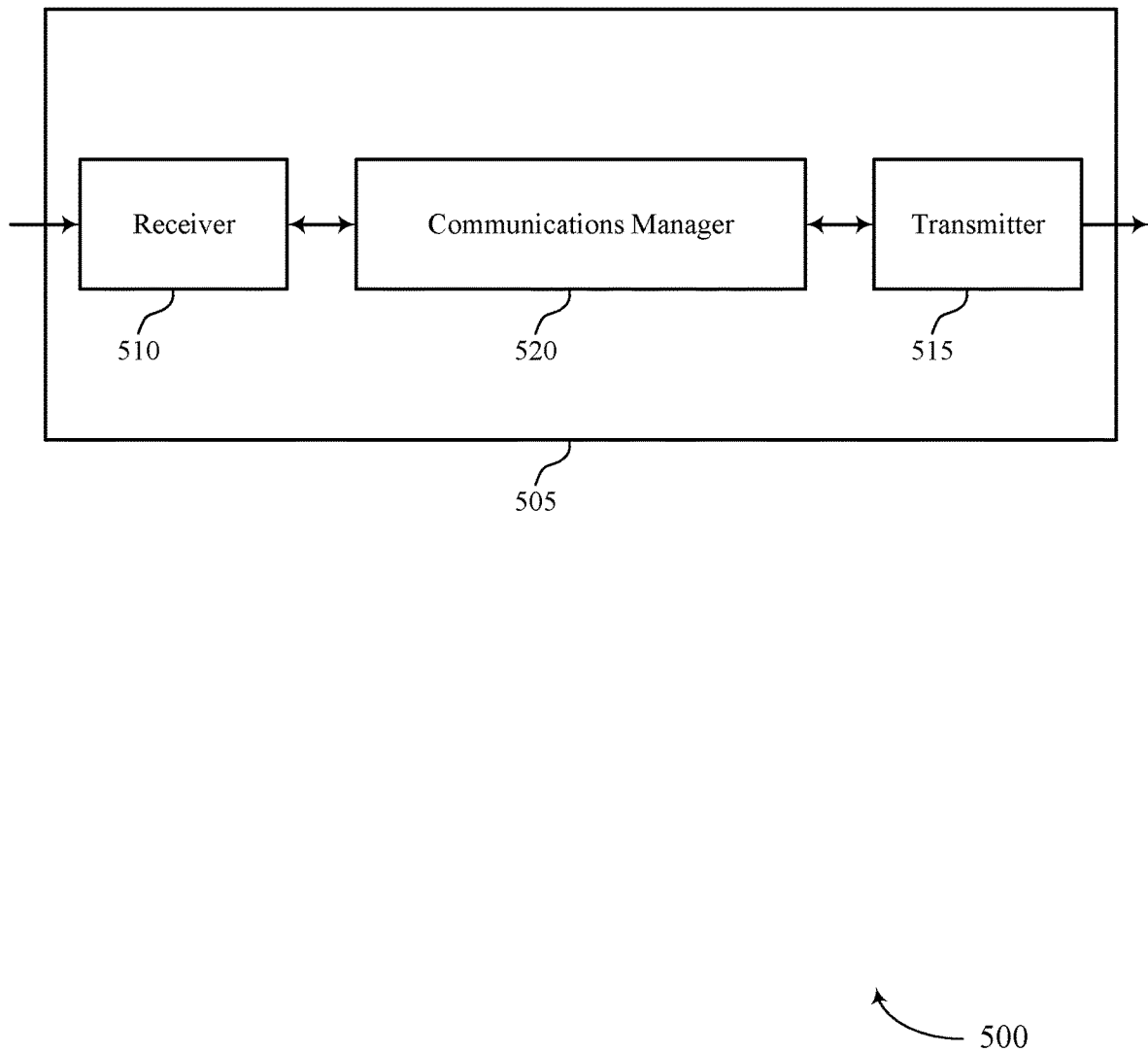
FIGS. 5 and 6 show block diagrams of devices that support enhanced protocol data unit discard procedures for multi-modal traffic in accordance with one or more aspects of the present disclosure.

FIG. 5 shows a block diagram 500 of a device 505 that supports enhanced protocol data unit discard procedures for multi-modal traffic in accordance with one or more aspects of the present disclosure. The device 505 may be an example of aspects of a UE 115 or a network entity 105 as described herein. The device 505 may include a receiver 510, a transmitter 515, and a communications manager 520. The device 505, or one or more components of the device 505 (e.g., the receiver 510, the transmitter 515, and the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to enhanced protocol data unit discard procedures for multi-modal traffic). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhanced protocol data unit discard procedures for multi-modal traffic). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhanced protocol data unit discard procedures for multi-modal traffic as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor. If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The communications manager 520 is capable of, configured to, or operable to support a means for discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

Additionally, or alternatively, the communications manager 520 may support wireless communications in accordance with examples as disclosed herein. For example, the communications manager 520 is capable of, configured to, or operable to support a means for outputting a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The communications manager 520 is capable of, configured to, or operable to support a means for monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur. The communications manager 520 is capable of, configured to, or operable to support a means for suspending the monitoring for the first PDU or the first PDU set from the first traffic flow based on expiration of the second discard timer for the second PDU or the second PDU set from the second traffic flow.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for more efficient utilization of communication resources.

Figure 6:
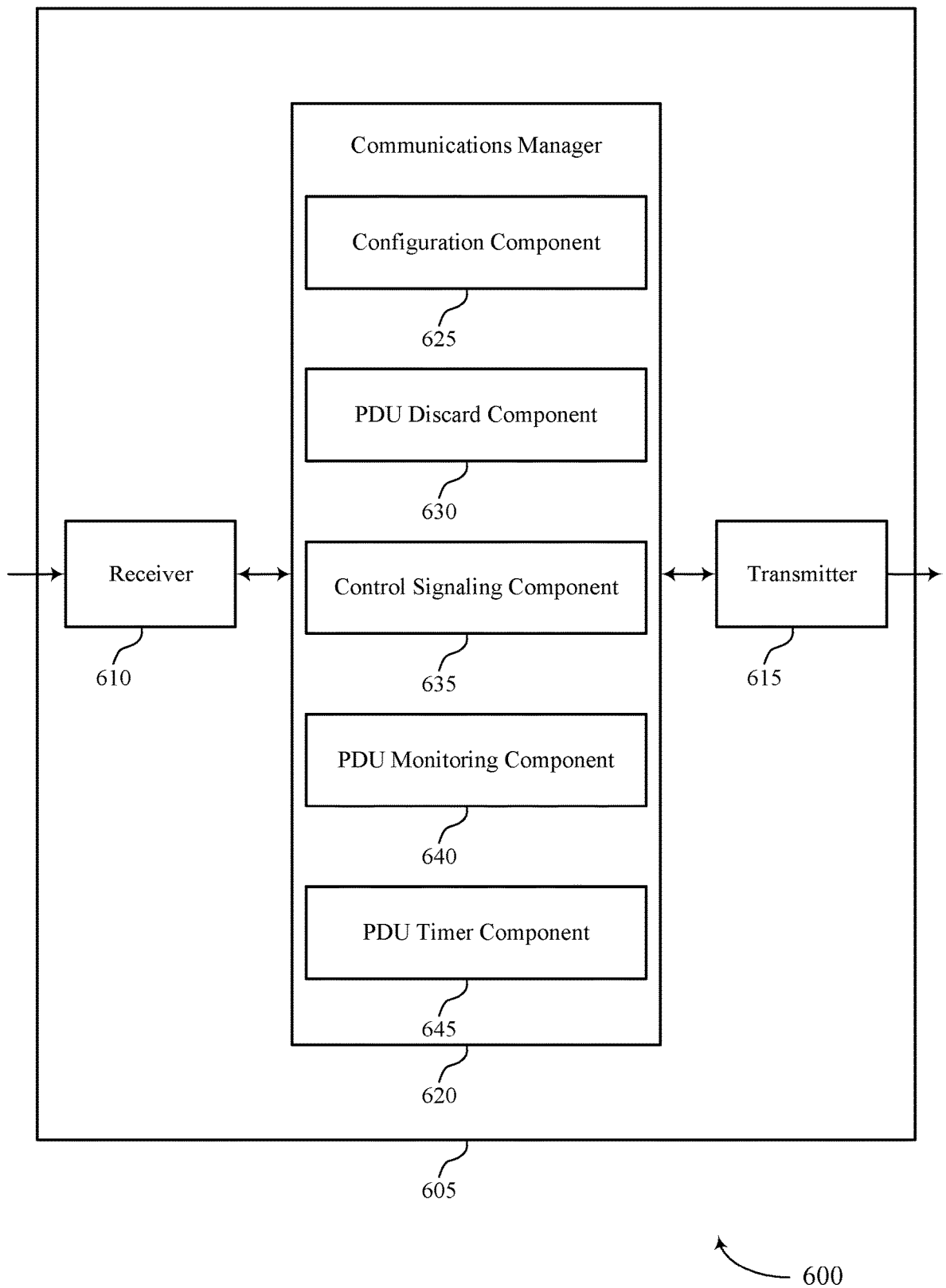

FIG. 6 shows a block diagram 600 of a device 605 that supports enhanced protocol data unit discard procedures for multi-modal traffic in accordance with one or more aspects of the present disclosure. The device 605 may be an example of aspects of a device 505, a UE 115, or a network entity 105 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced protocol data unit discard procedures for multi-modal traffic). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced protocol data unit discard procedures for multi-modal traffic). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhanced protocol data unit discard procedures for multi-modal traffic as described herein. For example, the communications manager 620 may include a configuration component 625, a PDU discard component 630, a control signaling component 635, a PDU monitoring component 640, a PDU timer component 645, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The configuration component 625 is capable of, configured to, or operable to support a means for receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The PDU discard component 630 is capable of, configured to, or operable to support a means for discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

Additionally, or alternatively, the communications manager 620 may support wireless communications in accordance with examples as disclosed herein. The control signaling component 635 is capable of, configured to, or operable to support a means for outputting a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The PDU monitoring component 640 is capable of, configured to, or operable to support a means for monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur. The PDU timer component 645 is capable of, configured to, or operable to support a means for suspending the monitoring for the first PDU or the first PDU set from the first traffic flow based on expiration of the second discard timer for the second PDU or the second PDU set from the second traffic flow.

Figure 7:
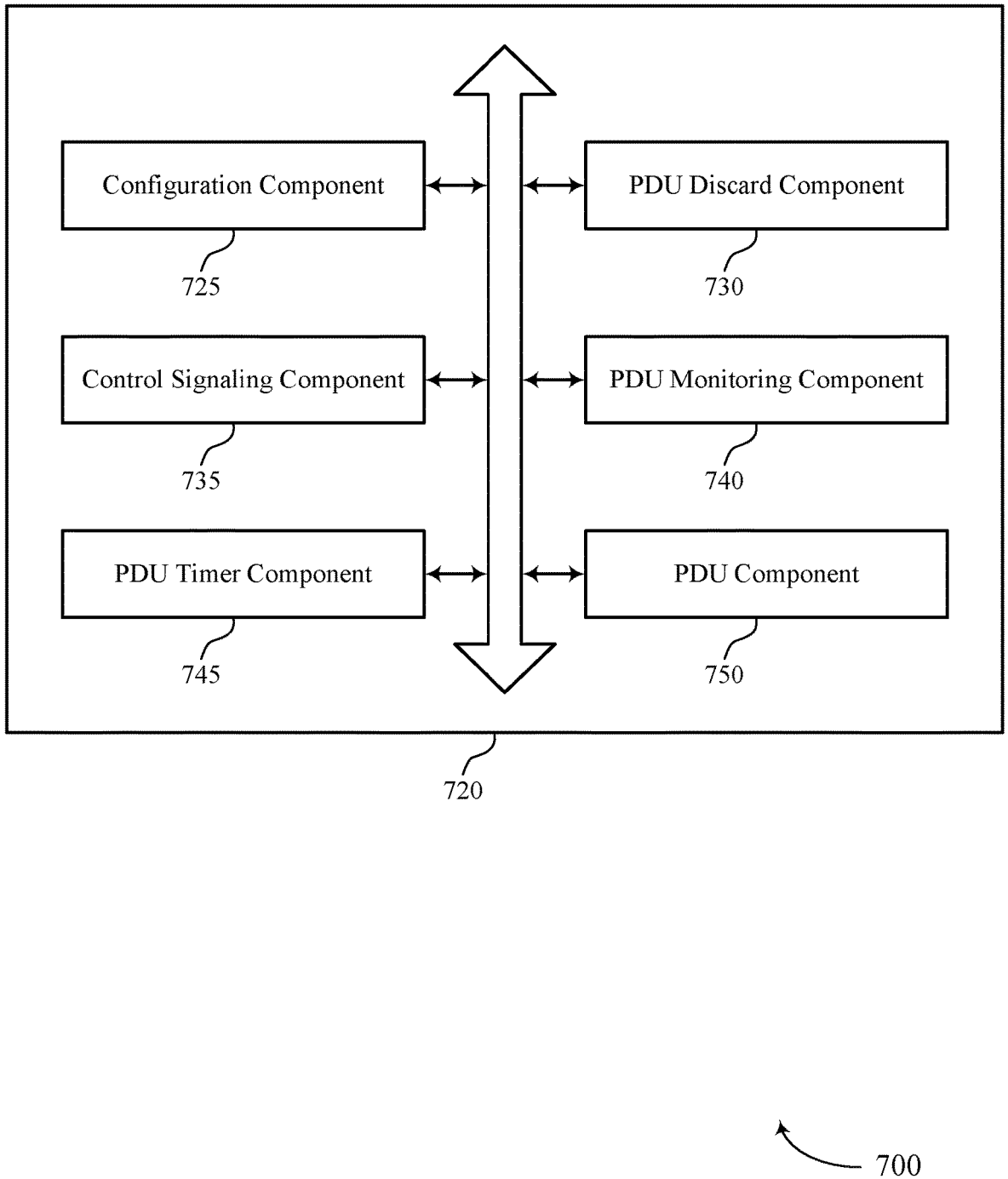
FIG. 7 shows a block diagram of a communications manager that supports enhanced protocol data unit discard procedures for multi-modal traffic in accordance with one or more aspects of the present disclosure.

FIG. 7 shows a block diagram 700 of a communications manager 720 that supports enhanced protocol data unit discard procedures for multi-modal traffic in accordance with one or more aspects of the present disclosure. The communications manager 720 may be an example of aspects of a communications manager 520, a communications manager 620, or both, as described herein. The communications manager 720, or various components thereof, may be an example of means for performing various aspects of enhanced protocol data unit discard procedures for multi-modal traffic as described herein. For example, the communications manager 720 may include a configuration component 725, a PDU discard component 730, a control signaling component 735, a PDU monitoring component 740, a PDU timer component 745, a PDU component 750, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communications in accordance with examples as disclosed herein. The configuration component 725 is capable of, configured to, or operable to support a means for receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The PDU discard component 730 is capable of, configured to, or operable to support a means for discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

In some examples, the control signaling component 735 is capable of, configured to, or operable to support a means for receiving control information indicating to discard the first PDU or the first PDU set based on expiration of the second discard timer for the second PDU or the second PDU set from the second traffic flow.

In some examples, the control message or a second control message includes the control information.

In some examples, the first PDU or the first PDU set is discarded after the synchronization time duration threshold has elapsed after expiration of the second discard timer.

In some examples, the PDU component 750 is capable of, configured to, or operable to support a means for transmitting a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

In some examples, the PDU component 750 is capable of, configured to, or operable to support a means for transmitting a third PDU or a third PDU set of the first traffic flow after expiration of the first discard timer and prior to a duration of time elapsing corresponding to the synchronization time duration threshold and an overhead time duration, the duration of time beginning upon communication of a fourth PDU or a fourth PDU set of the second traffic flow associated with the third PDU or the third PDU set.

In some examples, the control signaling component 735 is capable of, configured to, or operable to support a means for receiving an indication to discard a third PDU or a third PDU set of the first traffic flow based on one of expiration of the second discard timer or expiration of the first discard timer. In some examples, the PDU discard component 730 is capable of, configured to, or operable to support a means for discarding the third PDU or the third PDU set in accordance with the indication.

In some examples, the first PDU or the first PDU set is associated with an identifier that is shared with the second PDU or the second PDU set.

In some examples, the identifier indicates an association between the first traffic flow and the second traffic flow. In some examples, the first PDU or the first PDU set is discarded based on the expiration of the second discard timer and the identifier.

In some examples, the first wireless device is a UE or a network entity.

Additionally, or alternatively, the communications manager 720 may support wireless communications in accordance with examples as disclosed herein. The control signaling component 735 is capable of, configured to, or operable to support a means for outputting a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The PDU monitoring component 740 is capable of, configured to, or operable to support a means for monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur. The PDU timer component 745 is capable of, configured to, or operable to support a means for suspending the monitoring for the first PDU or the first PDU set from the first traffic flow based on expiration of the second discard timer for the second PDU or the second PDU set from the second traffic flow.

In some examples, the control signaling component 735 is capable of, configured to, or operable to support a means for outputting control information to a first wireless device indicating to discard a first PDU or a first PDU set based on expiration of the second discard timer for the second PDU or the second PDU set from the second traffic flow.

In some examples, the control message or a second control message includes the control information.

In some examples, the PDU monitoring component 740 is capable of, configured to, or operable to support a means for monitoring for a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

In some examples, the PDU monitoring component 740 is capable of, configured to, or operable to support a means for monitoring for a third PDU or a third PDU set of the first traffic flow after expiration of the first discard timer and prior to a duration of time elapsing corresponding to the synchronization time duration threshold and an overhead duration, the duration of time beginning upon communication of a fourth PDU or a fourth PDU set of the second traffic flow associated with the third PDU or the third PDU set.

In some examples, the PDU monitoring component 740 is capable of, configured to, or operable to support a means for monitoring for a third PDU or a third PDU set from the first traffic flow and a fourth PDU or a fourth PDU set from the second traffic flow in accordance with the configuration.

In some examples, the control signaling component 735 is capable of, configured to, or operable to support a means for outputting an indication for a first wireless device to discard a third PDU or a third PDU set of the first traffic flow based on one of expiration of the second discard timer or expiration of the first discard timer.

In some examples, the first PDU or the first PDU set is associated with an identifier that is shared with the second PDU or the second PDU set.

In some examples, the identifier indicates an association between the first traffic flow and the second traffic flow.

In some examples, the second wireless device is a UE or a network entity.

Figure 8:
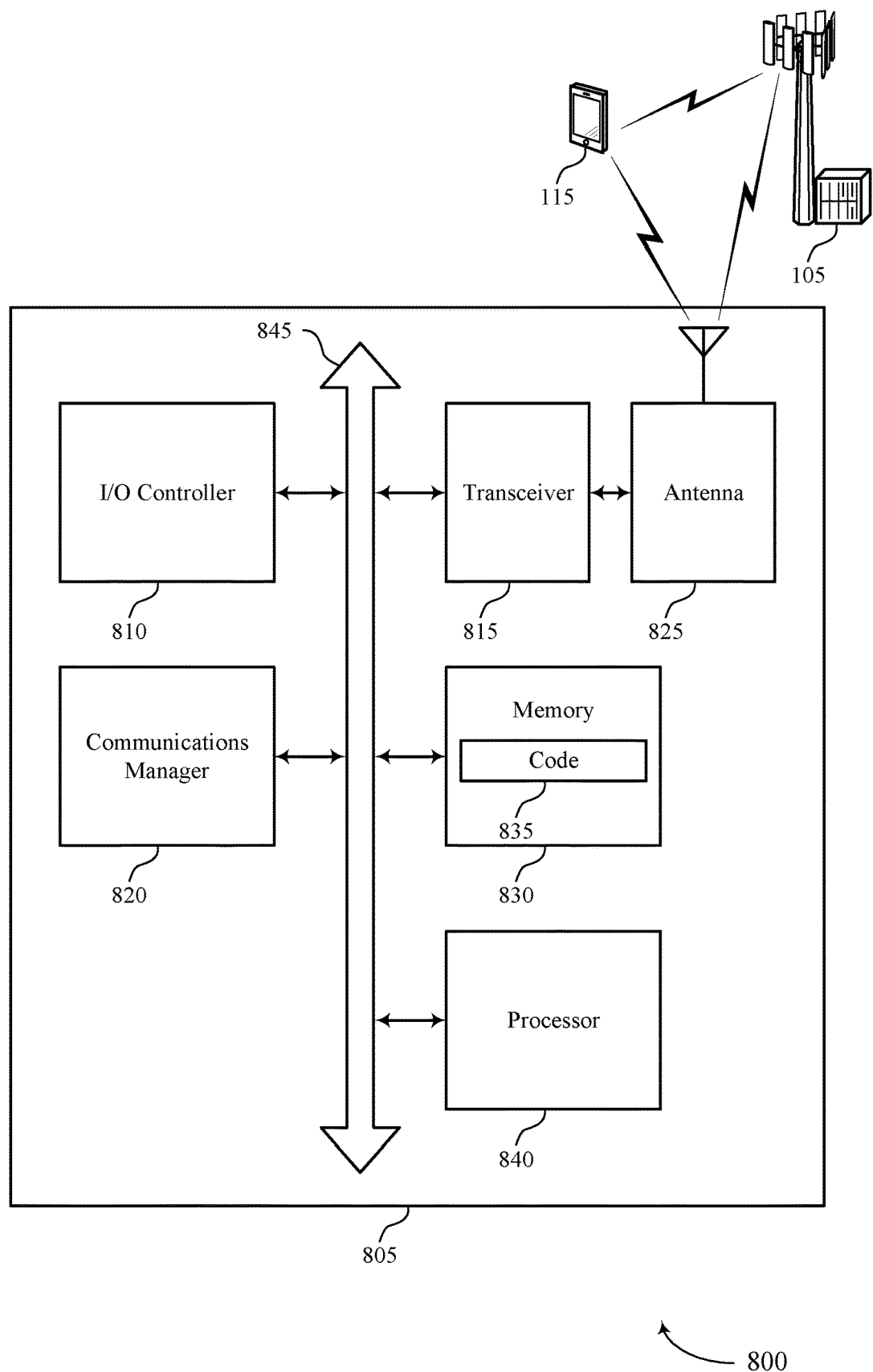
FIG. 8 shows a diagram of a system including a UE that supports enhanced protocol data unit discard procedures for multi-modal traffic in accordance with one or more aspects of the present disclosure.

FIG. 8 shows a diagram of a system 800 including a device 805 that supports enhanced protocol data unit discard procedures for multi-modal traffic in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable code 835 including instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may contain, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting enhanced protocol data unit discard procedures for multi-modal traffic). For example, the device 805 or a component of the device 805 may include at least one processor 840 and at least one memory 830 coupled with or to the at least one processor 840, the at least one processor 840 and at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs.

The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The communications manager 820 is capable of, configured to, or operable to support a means for discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

Additionally, or alternatively, the communications manager 820 may support wireless communications in accordance with examples as disclosed herein. For example, the communications manager 820 is capable of, configured to, or operable to support a means for outputting a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The communications manager 820 is capable of, configured to, or operable to support a means for monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur. The communications manager 820 is capable of, configured to, or operable to support a means for suspending the monitoring for the first PDU or the first PDU set from the first traffic flow based on expiration of the second discard timer for the second PDU or the second PDU set from the second traffic flow.

By including or configuring the communications manager 820 in accordance with examples as described herein, the device 805 may support techniques for improved communication reliability and improved user experience related to reduced latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of enhanced protocol data unit discard procedures for multi-modal traffic as described herein, or the at least one processor 840 and the at least one memory 830 may be otherwise configured to, individually or collectively, perform or support such operations.

Figure 9:
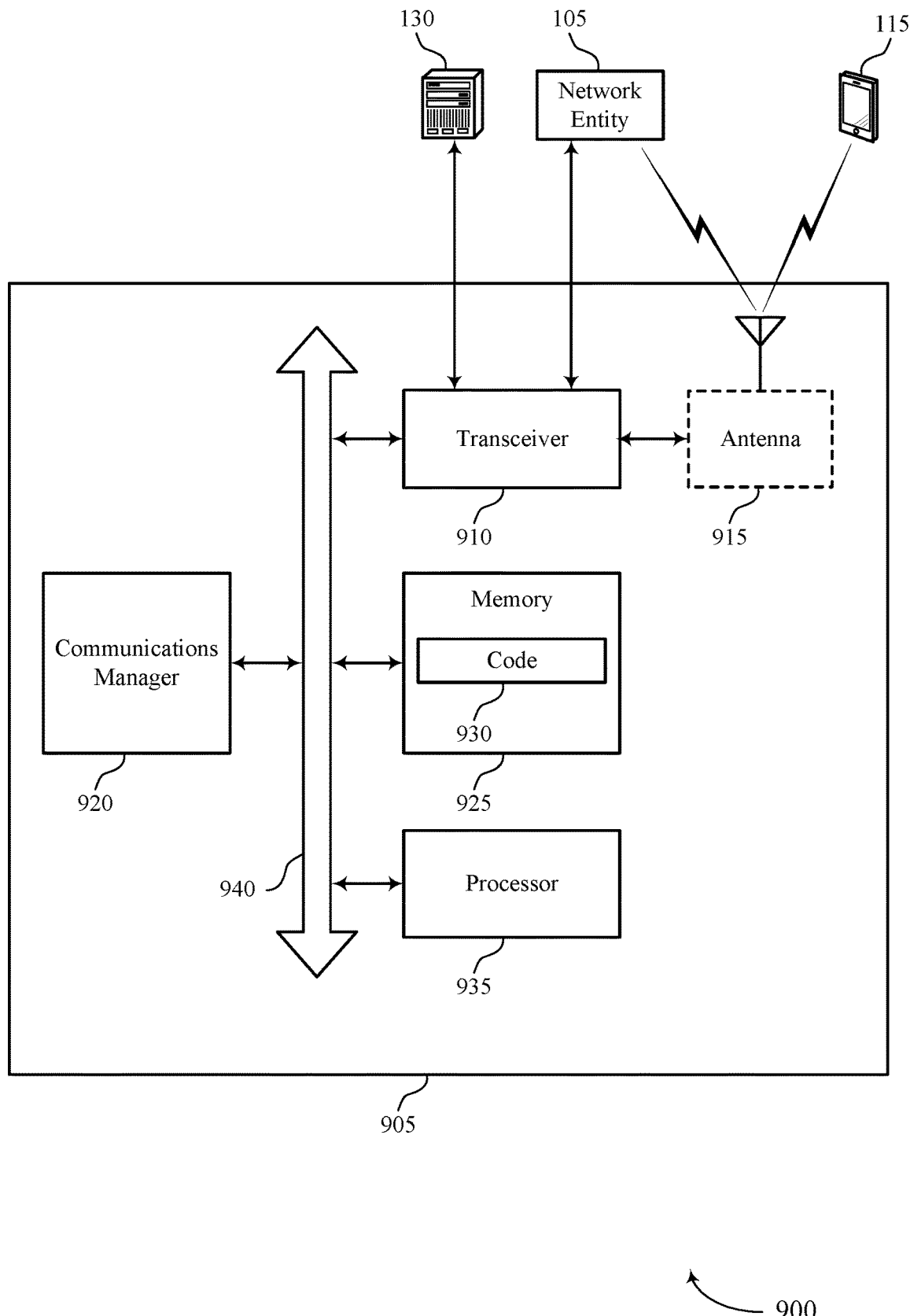
FIG. 9 shows a diagram of a system including a network entity that supports enhanced protocol data unit discard procedures for multi-modal traffic in accordance with one or more aspects of the present disclosure.

FIG. 9 shows a diagram of a system 900 including a device 905 that supports enhanced protocol data unit discard procedures for multi-modal traffic in accordance with one or more aspects of the present disclosure. The device 905 may be an example of or include the components of a device 505, a device 605, or a network entity 105 as described herein. The device 905 may communicate with one or more network entities 105, one or more UEs 115, or any combination thereof, which may include communications over one or more wired interfaces, over one or more wireless interfaces, or any combination thereof. The device 905 may include components that support outputting and obtaining communications, such as a communications manager 920, a transceiver 910, an antenna 915, at least one memory 925, code 930, and at least one processor 935. These components may be in electronic communication or otherwise coupled (e.g., operatively, communicatively, functionally, electronically, electrically) via one or more buses (e.g., a bus 940).

The transceiver 910 may support bi-directional communications via wired links, wireless links, or both as described herein. In some examples, the transceiver 910 may include a wired transceiver and may communicate bi-directionally with another wired transceiver. Additionally, or alternatively, in some examples, the transceiver 910 may include a wireless transceiver and may communicate bi-directionally with another wireless transceiver. In some examples, the device 905 may include one or more antennas 915, which may be capable of transmitting or receiving wireless transmissions (e.g., concurrently). The transceiver 910 may also include a modem to modulate signals, to provide the modulated signals for transmission (e.g., by one or more antennas 915, by a wired transmitter), to receive modulated signals (e.g., from one or more antennas 915, from a wired receiver), and to demodulate signals. In some implementations, the transceiver 910 may include one or more interfaces, such as one or more interfaces coupled with the one or more antennas 915 that are configured to support various receiving or obtaining operations, or one or more interfaces coupled with the one or more antennas 915 that are configured to support various transmitting or outputting operations, or a combination thereof. In some implementations, the transceiver 910 may include or be configured for coupling with one or more processors or one or more memory components that are operable to perform or support operations based on received or obtained information or signals, or to generate information or other signals for transmission or other outputting, or any combination thereof. In some implementations, the transceiver 910, or the transceiver 910 and the one or more antennas 915, or the transceiver 910 and the one or more antennas 915 and one or more processors or one or more memory components (e.g., the at least one processor 935, the at least one memory 925, or both), may be included in a chip or chip assembly that is installed in the device 905. In some examples, the transceiver 910 may be operable to support communications via one or more communications links (e.g., a communication link 125, a backhaul communication link 120, a midhaul communication link 162, a fronthaul communication link 168).

The at least one memory 925 may include RAM, ROM, or any combination thereof. The at least one memory 925 may store computer-readable, computer-executable code 930 including instructions that, when executed by one or more of the at least one processor 935, cause the device 905 to perform various functions described herein. The code 930 may be stored in a non-transitory computer-readable medium such as system memory or another type of memory. In some cases, the code 930 may not be directly executable by a processor of the at least one processor 935 but may cause a computer (e.g., when compiled and executed) to perform functions described herein. In some cases, the at least one memory 925 may contain, among other things, a BIOS which may control basic hardware or software operation such as the interaction with peripheral components or devices. In some examples, the at least one processor 935 may include multiple processors and the at least one memory 925 may include multiple memories. One or more of the multiple processors may be coupled with one or more of the multiple memories which may, individually or collectively, be configured to perform various functions herein (for example, as part of a processing system).

The at least one processor 935 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 935 may be configured to operate a memory array using a memory controller. In some other cases, a memory controller may be integrated into one or more of the at least one processor 935. The at least one processor 935 may be configured to execute computer-readable instructions stored in a memory (e.g., one or more of the at least one memory 925) to cause the device 905 to perform various functions (e.g., functions or tasks supporting enhanced protocol data unit discard procedures for multi-modal traffic). For example, the device 905 or a component of the device 905 may include at least one processor 935 and at least one memory 925 coupled with one or more of the at least one processor 935, the at least one processor 935 and the at least one memory 925 configured to perform various functions described herein. The at least one processor 935 may be an example of a cloud-computing platform (e.g., one or more physical nodes and supporting software such as operating systems, virtual machines, or container instances) that may host the functions (e.g., by executing code 930) to perform the functions of the device 905. The at least one processor 935 may be any one or more suitable processors capable of executing scripts or instructions of one or more software programs stored in the device 905 (such as within one or more of the at least one memory 925). In some examples, the at least one processor 935 may include multiple processors and the at least one memory 925 may include multiple memories. One or more of the multiple processors may be coupled with one or more of the multiple memories, which may, individually or collectively, be configured to perform various functions herein. In some examples, the at least one processor 935 may be a component of a processing system, which may refer to a system (such as a series) of machines, circuitry (including, for example, one or both of processor circuitry (which may include the at least one processor 935) and memory circuitry (which may include the at least one memory 925)), or components, that receives or obtains inputs and processes the inputs to produce, generate, or obtain a set of outputs.

The processing system may be configured to perform one or more of the functions described herein. For example, the at least one processor 935 or a processing system including the at least one processor 935 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 925 or otherwise, to perform one or more of the functions described herein.

In some examples, a bus 940 may support communications of (e.g., within) a protocol layer of a protocol stack. In some examples, a bus 940 may support communications associated with a logical channel of a protocol stack (e.g., between protocol layers of a protocol stack), which may include communications performed within a component of the device 905, or between different components of the device 905 that may be co-located or located in different locations (e.g., where the device 905 may refer to a system in which one or more of the communications manager 920, the transceiver 910, the at least one memory 925, the code 930, and the at least one processor 935 may be located in one of the different components or divided between different components).

In some examples, the communications manager 920 may manage aspects of communications with a core network 130 (e.g., via one or more wired or wireless backhaul links). For example, the communications manager 920 may manage the transfer of data communications for client devices, such as one or more UEs 115. In some examples, the communications manager 920 may manage communications with other network entities 105, and may include a controller or scheduler for controlling communications with UEs 115 in cooperation with other network entities 105. In some examples, the communications manager 920 may support an X2 interface within an LTE/LTE-A wireless communications network technology to provide communication between network entities 105.

The communications manager 920 may support wireless communications in accordance with examples as disclosed herein. For example, the communications manager 920 is capable of, configured to, or operable to support a means for receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The communications manager 920 is capable of, configured to, or operable to support a means for discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur.

Additionally, or alternatively, the communications manager 920 may support wireless communications in accordance with examples as disclosed herein. For example, the communications manager 920 is capable of, configured to, or operable to support a means for outputting a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The communications manager 920 is capable of, configured to, or operable to support a means for monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur. The communications manager 920 is capable of, configured to, or operable to support a means for suspending the monitoring for the first PDU or the first PDU set from the first traffic flow based on expiration of the second discard timer for the second PDU or the second PDU set from the second traffic flow.

By including or configuring the communications manager 920 in accordance with examples as described herein, the device 905 may support techniques for improved communication reliability and improved user experience related to reduced latency.

In some examples, the communications manager 920 may be configured to perform various operations (e.g., receiving, obtaining, monitoring, outputting, transmitting) using or otherwise in cooperation with the transceiver 910, the one or more antennas 915 (e.g., where applicable), or any combination thereof. Although the communications manager 920 is illustrated as a separate component, in some examples, one or more functions described with reference to the communications manager 920 may be supported by or performed by the transceiver 910, one or more of the at least one processor 935, one or more of the at least one memory 925, the code 930, or any combination thereof (for example, by a processing system including at least a portion of the at least one processor 935, the at least one memory 925, the code 930, or any combination thereof). For example, the code 930 may include instructions executable by one or more of the at least one processor 935 to cause the device 905 to perform various aspects of enhanced protocol data unit discard procedures for multi-modal traffic as described herein, or the at least one processor 935 and the at least one memory 925 may be otherwise configured to, individually or collectively, perform or support such operations.

Figure 10:
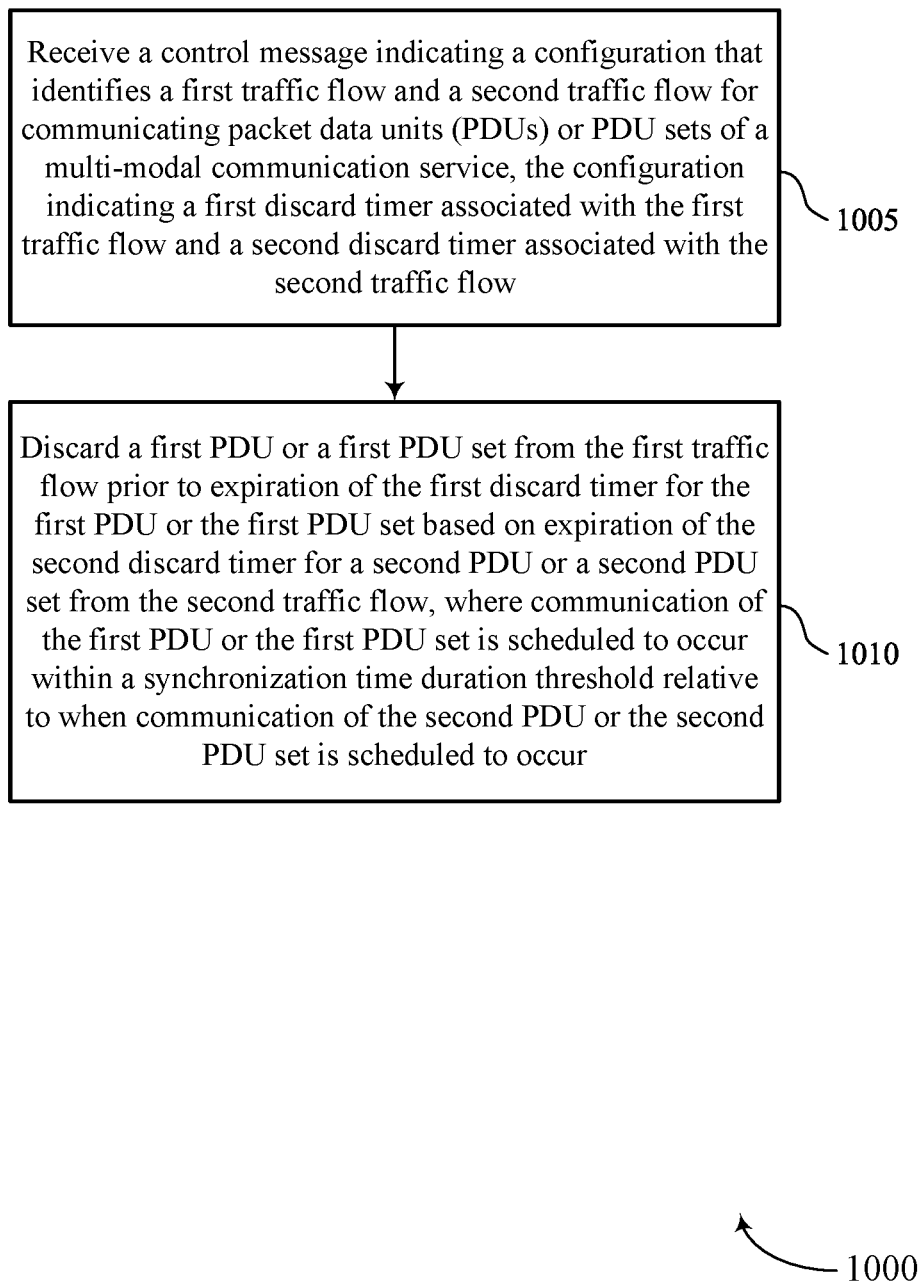
FIGS. 10 through 13 show flowcharts illustrating methods that support enhanced protocol data unit discard procedures for multi-modal traffic in accordance with one or more aspects of the present disclosure.

FIG. 10 shows a flowchart illustrating a method 1000 that supports enhanced protocol data unit discard procedures for multi-modal traffic in accordance with one or more aspects of the present disclosure. The operations of the method 1000 may be implemented by a UE or a network entity or its components as described herein. For example, the operations of the method 1000 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1005, the method may include receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The operations of block 1005 may be performed in accordance with examples as disclosed herein. In some examples, aspects of the operations of 1005 may be performed by a configuration component 725 as described with reference to FIG. 7.

At 1010, the method may include discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur. The operations of block 1010 may be performed in accordance with examples as disclosed herein. In some examples, aspects of the operations of 1010 may be performed by a PDU discard component 730 as described with reference to FIG. 7.

Figure 11:
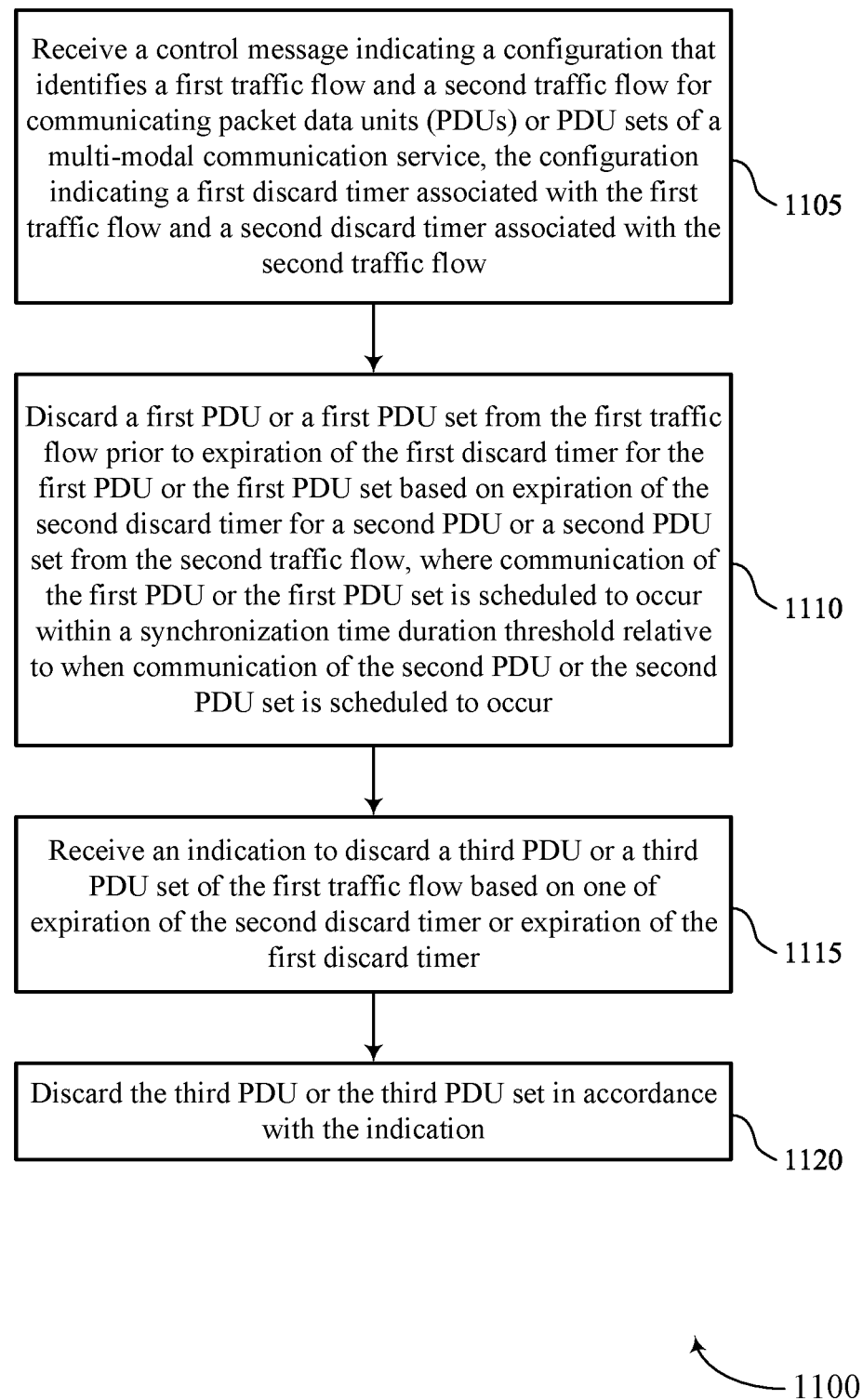

FIG. 11 shows a flowchart illustrating a method 1100 that supports enhanced protocol data unit discard procedures for multi-modal traffic in accordance with one or more aspects of the present disclosure. The operations of the method 1100 may be implemented by a UE or a network entity or its components as described herein. For example, the operations of the method 1100 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1105, the method may include receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The operations of block 1105 may be performed in accordance with examples as disclosed herein. In some examples, aspects of the operations of 1105 may be performed by a configuration component 725 as described with reference to FIG. 7.

At 1110, the method may include discarding a first PDU or a first PDU set from the first traffic flow prior to expiration of the first discard timer for the first PDU or the first PDU set based on expiration of the second discard timer for a second PDU or a second PDU set from the second traffic flow, where communication of the first PDU or the first PDU set is scheduled to occur within a synchronization time duration threshold relative to when communication of the second PDU or the second PDU set is scheduled to occur. The operations of block 1110 may be performed in accordance with examples as disclosed herein. In some examples, aspects of the operations of 1110 may be performed by a PDU discard component 730 as described with reference to FIG. 7.

At 1115, the method may include receiving an indication to discard a third PDU or a third PDU set of the first traffic flow based on one of expiration of the second discard timer or expiration of the first discard timer. The operations of block 1115 may be performed in accordance with examples as disclosed herein. In some examples, aspects of the operations of 1115 may be performed by a control signaling component 735 as described with reference to FIG. 7.

At 1120, the method may include discarding the third PDU or the third PDU set in accordance with the indication.

The operations of block 1120 may be performed in accordance with examples as disclosed herein. In some examples, aspects of the operations of 1120 may be performed by a PDU discard component 730 as described with reference to FIG. 7.

Figure 12:
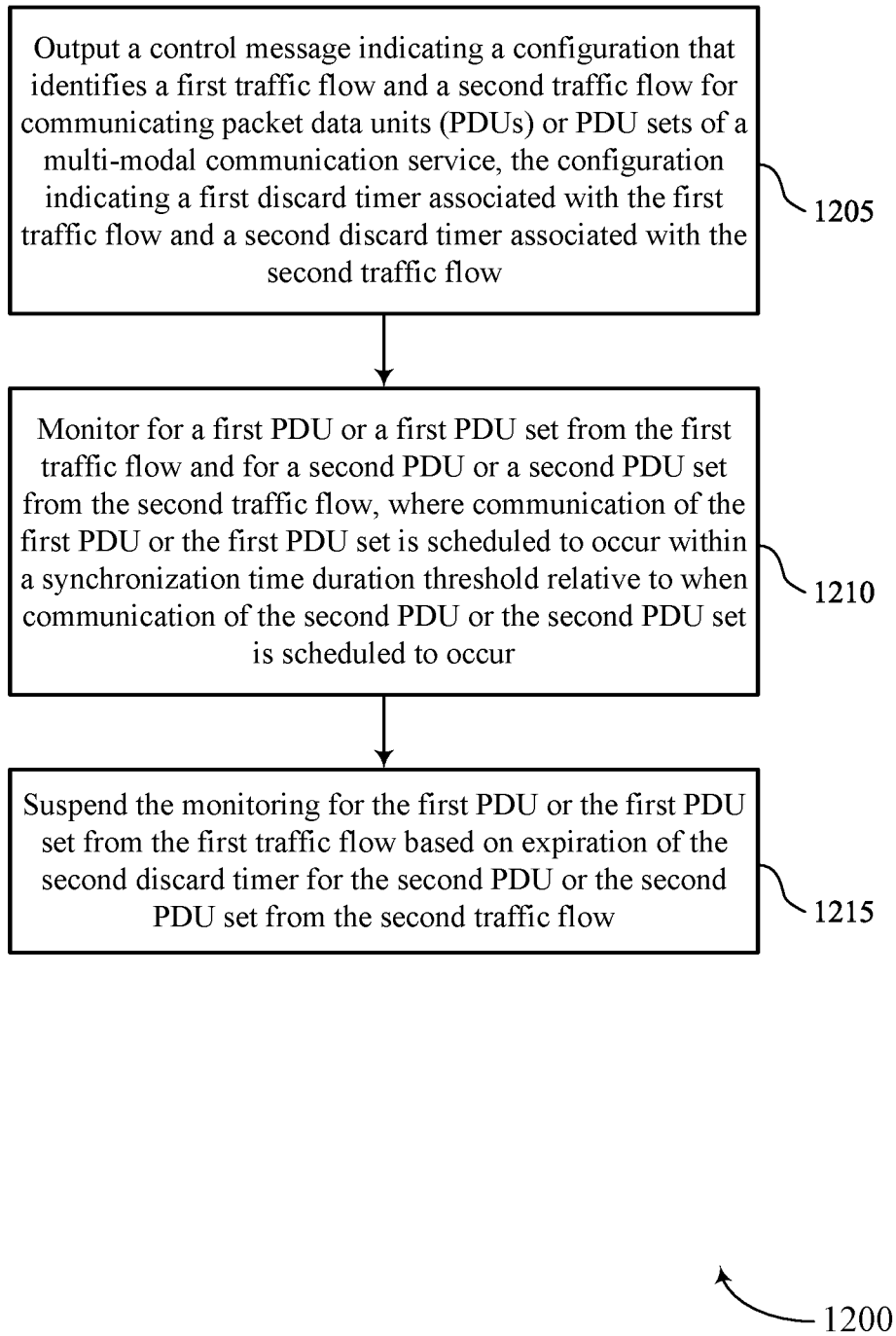

FIG. 12 shows a flowchart illustrating a method 1200 that supports enhanced protocol data unit discard procedures for multi-modal traffic in accordance with one or more aspects of the present disclosure. The operations of the method 1200 may be implemented by a UE or a network entity or its components as described herein. For example, the operations of the method 1200 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1205, the method may include outputting a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The operations of block 1205 may be performed in accordance with examples as disclosed herein. In some examples, aspects of the operations of 1205 may be performed by a control signaling component 735 as described with reference to FIG. 7.

At 1210, the method may include monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur. The operations of block 1210 may be performed in accordance with examples as disclosed herein. In some examples, aspects of the operations of 1210 may be performed by a PDU monitoring component 740 as described with reference to FIG. 7.

At 1215, the method may include suspending the monitoring for the first PDU or the first PDU set from the first traffic flow based on expiration of the second discard timer for the second PDU or the second PDU set from the second traffic flow. The operations of block 1215 may be performed in accordance with examples as disclosed herein. In some examples, aspects of the operations of 1215 may be performed by a PDU timer component 745 as described with reference to FIG. 7.

Figure 13:
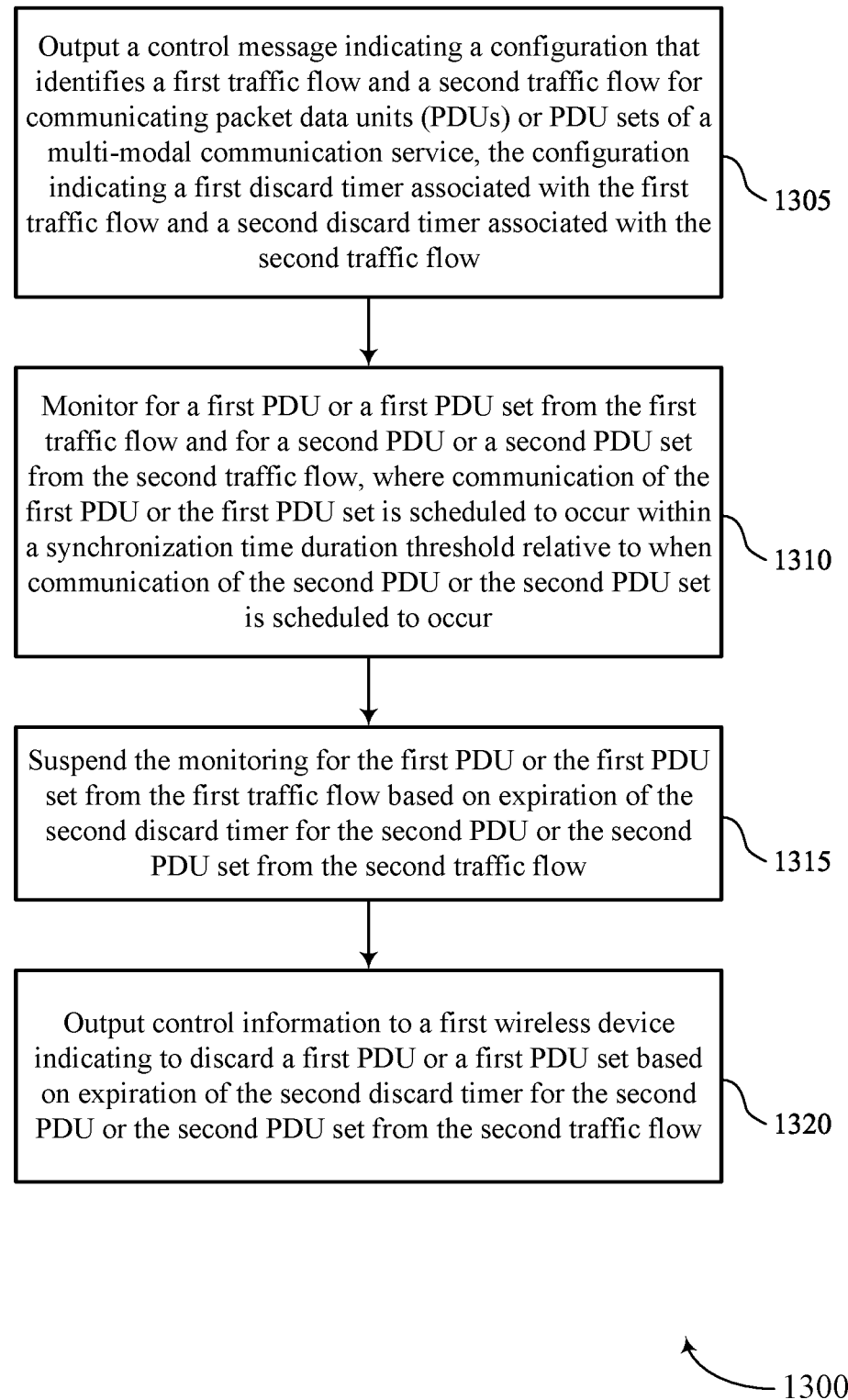

FIG. 13 shows a flowchart illustrating a method 1300 that supports enhanced protocol data unit discard procedures for multi-modal traffic in accordance with one or more aspects of the present disclosure. The operations of the method 1300 may be implemented by a UE or a network entity or its components as described herein. For example, the operations of the method 1300 may be performed by a UE 115 or a network entity as described with reference to FIGS. 1 through 9. In some examples, a UE or a network entity may execute a set of instructions to control the functional elements of the UE or the network entity to perform the described functions. Additionally, or alternatively, the UE or the network entity may perform aspects of the described functions using special-purpose hardware.

At 1305, the method may include outputting a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow. The operations of block 1305 may be performed in accordance with examples as disclosed herein. In some examples, aspects of the operations of 1305 may be performed by a control signaling component 735 as described with reference to FIG. 7.

At 1310, the method may include monitoring for a first PDU or a first PDU set from the first traffic flow and for a second PDU or a second PDU set from the second traffic flow, where communication of the first PDU or the first PDU set is scheduled to occur within a synchronization time duration threshold relative to when communication of the second PDU or the second PDU set is scheduled to occur. The operations of block 1310 may be performed in accordance with examples as disclosed herein. In some examples, aspects of the operations of 1310 may be performed by a PDU monitoring component 740 as described with reference to FIG. 7.

At 1315, the method may include suspending the monitoring for the first PDU or the first PDU set from the first traffic flow based on expiration of the second discard timer for the second PDU or the second PDU set from the second traffic flow. The operations of block 1315 may be performed in accordance with examples as disclosed herein. In some examples, aspects of the operations of 1315 may be performed by a PDU timer component 745 as described with reference to FIG. 7.

At 1320, the method may include outputting control information to a first wireless device indicating to discard a first PDU or a first PDU set based on expiration of the second discard timer for the second PDU or the second PDU set from the second traffic flow. The operations of block 1320 may be performed in accordance with examples as disclosed herein. In some examples, aspects of the operations of 1320 may be performed by a control signaling component 735 as described with reference to FIG. 7.

The following provides an overview of aspects of the present disclosure:

Aspect 1: A method for wireless communications at a first wireless device, comprising: receiving a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow; and discarding a first PDU or a first PDU set from the first traffic flow prior to expiration of the first discard timer for the first PDU or the first PDU set based at least in part on expiration of the second discard timer for a second PDU or a second PDU set from the second traffic flow, wherein communication of the first PDU or the first PDU set is scheduled to occur within a synchronization time duration threshold relative to when communication of the second PDU or the second PDU set is scheduled to occur.

Aspect 2: The method of aspect 1, further comprising: receiving control information indicating to discard the first PDU or the first PDU set based at least in part on expiration of the second discard timer for the second PDU or the second PDU set from the second traffic flow.

Aspect 3: The method of aspect 2, wherein the control message or a second control message comprises the control information.

Aspect 4: The method of any of aspects 1 through 3, wherein the first PDU or the first PDU set is discarded after the synchronization time duration threshold has elapsed after expiration of the second discard timer.

Aspect 5: The method of any of aspects 1 through 4, further comprising: transmitting a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

Aspect 6: The method of any of aspects 1 through 5, further comprising: transmitting a third PDU or a third PDU set of the first traffic flow after expiration of the first discard timer and prior to a duration of time elapsing corresponding to the synchronization time duration threshold and an overhead time duration, the duration of time beginning upon communication of a fourth PDU or a fourth PDU set of the second traffic flow associated with the third PDU or the third PDU set.

Aspect 7: The method of any of aspects 1 through 6, further comprising: receiving an indication to discard a third PDU or a third PDU set of the first traffic flow based at least in part on one of expiration of the second discard timer or expiration of the first discard timer; and discarding the third PDU or the third PDU set in accordance with the indication.

Aspect 8: The method of any of aspects 1 through 7, wherein the first PDU or the first PDU set is associated with an identifier that is shared with the second PDU or the second PDU set.

Aspect 9: The method of aspect 8, wherein the identifier indicates an association between the first traffic flow and the second traffic flow, and the first PDU or the first PDU set is discarded based at least in part on the expiration of the second discard timer and the identifier.

Aspect 10: The method of any of aspects 1 through 9, wherein the first wireless device is a UE or a network entity.

Aspect 11: A method for wireless communications at a second wireless device, comprising: outputting a control message indicating a configuration that identifies a first traffic flow and a second traffic flow for communicating PDUs or PDU sets of a multi-modal communication service, the configuration indicating a first discard timer associated with the first traffic flow and a second discard timer associated with the second traffic flow; monitoring for a first PDU or a first PDU set from the first traffic flow and for a second PDU or a second PDU set from the second traffic flow, wherein communication of the first PDU or the first PDU set is scheduled to occur within a synchronization time duration threshold relative to when communication of the second PDU or the second PDU set is scheduled to occur; and suspending the monitoring for the first PDU or the first PDU set from the first traffic flow based at least in part on expiration of the second discard timer for the second PDU or the second PDU set from the second traffic flow.

Aspect 12: The method of aspect 11, further comprising: outputting control information to a first wireless device indicating to discard a first PDU or a first PDU set based at least in part on expiration of the second discard timer for the second PDU or the second PDU set from the second traffic flow.

Aspect 13: The method of aspect 12, wherein the control message or a second control message comprises the control information.

Aspect 14: The method of any of aspects 11 through 13, further comprising: monitoring for a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

Aspect 15: The method of any of aspects 11 through 14, further comprising: monitoring for a third PDU or a third PDU set of the first traffic flow after expiration of the first discard timer and prior to a duration of time elapsing corresponding to the synchronization time duration threshold and an overhead duration, the duration of time beginning upon communication of a fourth PDU or a fourth PDU set of the second traffic flow associated with the third PDU or the third PDU set.

Aspect 16: The method of any of aspects 11 through 15, further comprising: monitoring for a third PDU or a third PDU set from the first traffic flow and a fourth PDU or a fourth PDU set from the second traffic flow in accordance with the configuration.

Aspect 17: The method of any of aspects 11 through 16, further comprising: outputting an indication for a first wireless device to discard a third PDU or a third PDU set of the first traffic flow based at least in part on one of expiration of the second discard timer or expiration of the first discard timer.

Aspect 18: The method of any of aspects 11 through 17, wherein the first PDU or the first PDU set is associated with an identifier that is shared with the second PDU or the second PDU set.

Aspect 19: The method of aspect 18, wherein the identifier indicates an association between the first traffic flow and the second traffic flow.

Aspect 20: The method of any of aspects 11 through 19, wherein the second wireless device is a UE or a network entity.

Aspect 21: A first wireless device for wireless communications, comprising one or more memories storing processor-executable code, and one or more processors coupled with the one or more memories and individually or collectively operable to execute the code to cause the first wireless device to perform a method of any of aspects 1 through 10.

Aspect 22: A first wireless device for wireless communications, comprising at least one means for performing a method of any of aspects 1 through 10.

Aspect 23: A non-transitory computer-readable medium storing code for wireless communications, the code comprising instructions executable by one or more processors to perform a method of any of aspects 1 through 10.

Aspect 24: A second wireless device for wireless communications, comprising one or more memories storing processor-executable code, and one or more processors coupled with the one or more memories and individually or collectively operable to execute the code to cause the second wireless device to perform a method of any of aspects 11 through 20.

Aspect 25: A second wireless device for wireless communications, comprising at least one means for performing a method of any of aspects 11 through 20.

Aspect 26: A non-transitory computer-readable medium storing code for wireless communications, the code comprising instructions executable by one or more processors to perform a method of any of aspects 11 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device, comprising:
one or more memories storing processor-executable code; and
one or more processors coupled with the one or more memories and individually or collectively operable to execute the code to cause the first wireless device to:
receive a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow; and
discard a first PDU or a first PDU set from the first traffic flow prior to expiration of the first discard timer for the first PDU or the first PDU set based at least in part on expiration of the second discard timer for a second PDU or a second PDU set from the second traffic flow, wherein communication of the first PDU or the first PDU set is scheduled to occur within a synchronization time duration threshold relative to when communication of the second PDU or the second PDU set is scheduled to occur.

2. The first wireless device of claim 1, wherein the one or more processors are individually or collectively further operable to execute the code to cause the first wireless device to:
receive control information indicating to discard the first PDU or the first PDU set based at least in part on expiration of the second discard timer for the second PDU or the second PDU set from the second traffic flow.

3. The first wireless device of claim 2, wherein the control message or a second control message comprises the control information.

4. The first wireless device of claim 1, wherein the first PDU or the first PDU set is discarded after the synchronization time duration threshold has elapsed after expiration of the second discard timer.

5. The first wireless device of claim 1, wherein the one or more processors are individually or collectively further operable to execute the code to cause the first wireless device to:
transmit a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

6. The first wireless device of claim 1, wherein the one or more processors are individually or collectively further operable to execute the code to cause the first wireless device to:
transmit a third PDU or a third PDU set of the first traffic flow after expiration of the first discard timer and prior to a duration of time elapsing corresponding to the synchronization time duration threshold and an overhead time duration, the duration of time beginning upon communication of a fourth PDU or a fourth PDU set of the second traffic flow associated with the third PDU or the third PDU set.

7. The first wireless device of claim 1, wherein the one or more processors are individually or collectively further operable to execute the code to cause the first wireless device to:
receive an indication to discard a third PDU or a third PDU set of the first traffic flow based at least in part on one of expiration of the second discard timer or expiration of the first discard timer; and
discard the third PDU or the third PDU set in accordance with the indication.

8. The first wireless device of claim 1, wherein the first PDU or the first PDU set is associated with an identifier that is shared with the second PDU or the second PDU set.

9. The first wireless device of claim 8, wherein:
the identifier indicates an association between the first traffic flow and the second traffic flow, and
the first PDU or the first PDU set is discarded based at least in part on the expiration of the second discard timer and the identifier.

10. The first wireless device of claim 1, wherein the first wireless device is a user equipment (UE) or a network entity.

11. A method for wireless communications at a first wireless device, comprising:
receiving a control message indicating a configuration that identifies a first traffic flow and a second traffic flow for communicating packet data units (PDUs) or PDU sets of a multi-modal communication service, the configuration indicating a first discard timer associated with the first traffic flow and a second discard timer associated with the second traffic flow; and discarding a first PDU or a first PDU set from the first traffic flow prior to expiration of the first discard timer for the first PDU or the first PDU set based at least in part on expiration of the second discard timer for a second PDU or a second PDU set from the second traffic flow, wherein communication of the first PDU or the first PDU set is scheduled to occur within a synchronization time duration threshold relative to when communication of the second PDU or the second PDU set is scheduled to occur.

12. The method of claim 11, further comprising:

receiving control information indicating to discard the first PDU or the first PDU set based at least in part on expiration of the second discard timer for the second PDU or the second PDU set from the second traffic flow.

13. The method of claim 11, further comprising:

transmitting a third PDU or a third PDU set of the first traffic flow after expiration of the second discard timer and prior to a duration of time elapsing corresponding to the synchronization time duration threshold, the duration of time beginning upon communication of a fourth PDU or a fourth PDU set of the second traffic flow associated with the third PDU or the third PDU set.

14. The method of claim 11, further comprising:

transmitting a third PDU or a third PDU set of the first traffic flow after expiration of the first discard timer and prior to a duration of time elapsing corresponding to the synchronization time duration threshold and an overhead time duration, the duration of time beginning upon communication of a fourth PDU or a fourth PDU set of the second traffic flow associated with the third PDU or the third PDU set.

15. The method of claim 11, further comprising:

receiving an indication to discard a third PDU or a third PDU set of the first traffic flow based at least in part on one of expiration of the second discard timer or expiration of the first discard timer; and discarding the third PDU or the third PDU set in accordance with the indication.

\* \* \* \* \*